United States Patent [19]

Winchell

[11] Patent Number: 4,550,224

[45] Date of Patent: Oct. 29, 1985

[54] METHOD AND APPARATUS FOR ADDING CONFEREES TO A CONFERENCE

[75] Inventor: David F. Winchell, Glen Ellyn, Ill.

[73] Assignee: AT&T Bell Laboratories, Murray Hill, N.J.

[21] Appl. No.: 450,255

[22] Filed: Dec. 16, 1982

[51] Int. Cl.[4] .............................................. H04M 3/56
[52] U.S. Cl. .................................. 179/18 BC; 370/62
[58] Field of Search ...................... 179/18 BC, 18 BG; 370/62

[56] References Cited

U.S. PATENT DOCUMENTS

| 2,333,140 | 11/1943 | Allen | 179/27 CA |
| 3,912,874 | 10/1975 | Botterell et al. | 179/18 BC |
| 4,086,438 | 4/1978 | Kahn et al. | 179/18 BE |
| 4,475,189 | 10/1984 | Herr et al. | 370/62 |

FOREIGN PATENT DOCUMENTS 129868 8/1983 Japan .............................. 179/18 BC

OTHER PUBLICATIONS

"Touch-Tone Signaling on Private Telephone Networks", R. J. Angner, *Bell Laboratories Record*, Dec. 1970, pp. 337-341.

Primary Examiner—Thomas W. Brown
Attorney, Agent, or Firm—Charles H. Davis; Richard J. Godlewski

[57] ABSTRACT

In a telecommunications conference system, a warning tone is applied to a conference bridge to inform the participants that another conferee is about to be included in the conference. The conferee is only added after a brief interval so as not to disrupt the existing conference.

10 Claims, 22 Drawing Figures

DATA LINK PROCESSOR 601

PORT DATA INTERFACE 608

MAIN PROCESSOR SYSTEM

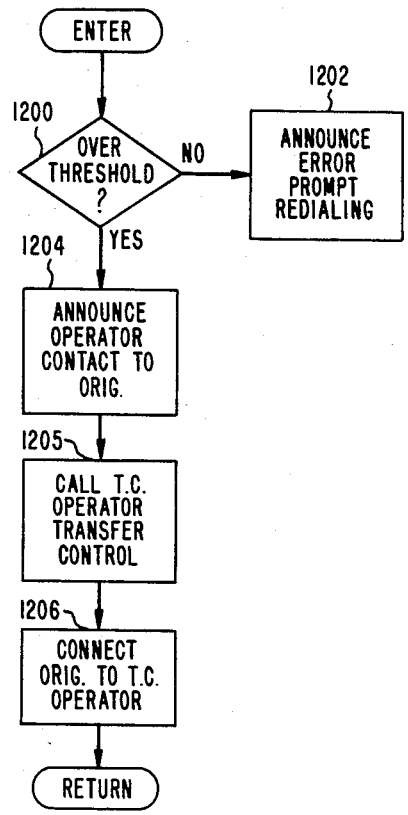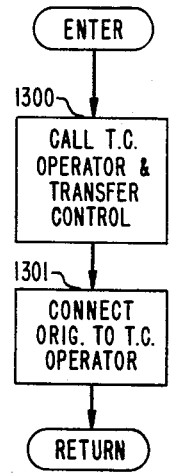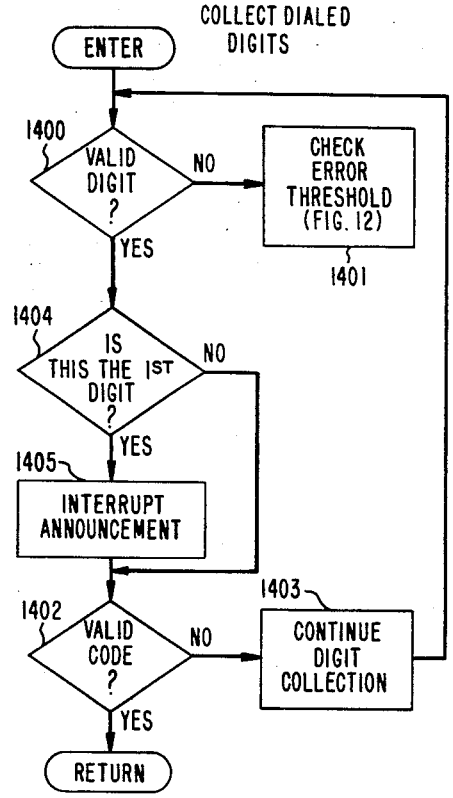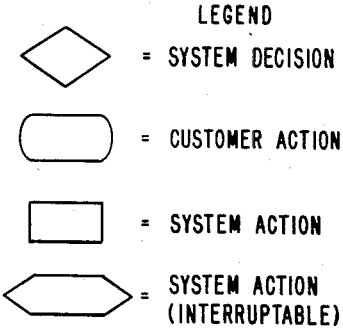

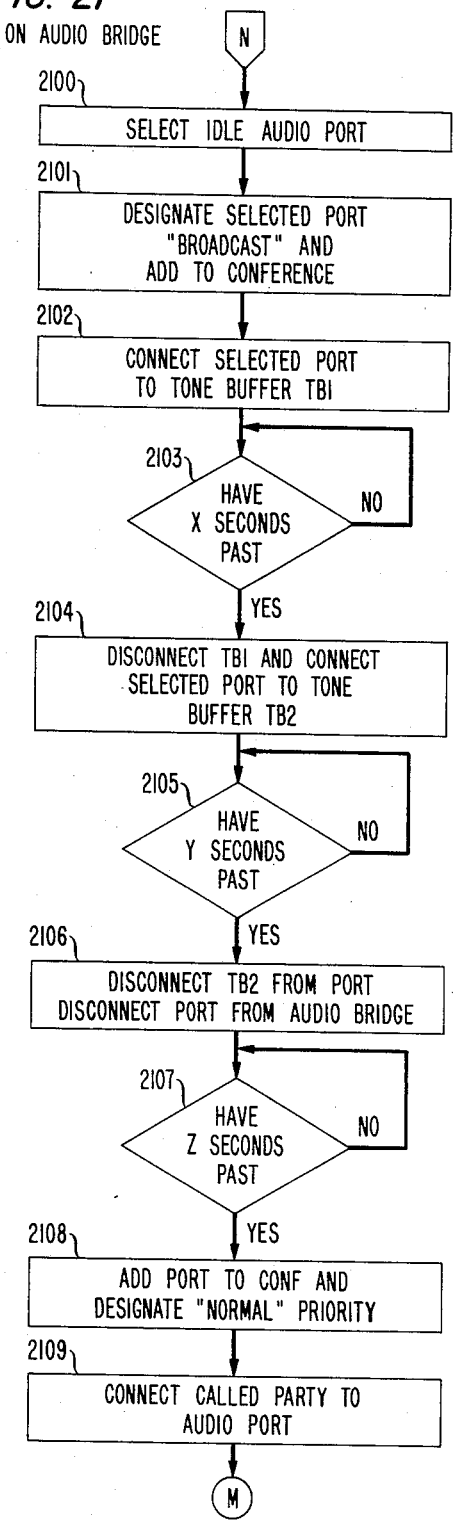

4,550,224

METHOD AND APPARATUS FOR ADDING CONFEREES TO A CONFERENCE

TECHNICAL FIELD

This invention relates to communication systems and particularly to conference arrangements. In a more particular aspect this invention relates to a method and apparatus for adding conferees to a conference.

BACKGROUND OF THE INVENTION

In a communication network it is desirable to provide conference arrangements whereby many customers can be bridged together on a conference call. In the so called "dial-up" conference arrangements, each conferee is summoned at the appropriate time by establishing a communication path to the customer station. The customer is informed that he or she is wanted for a conference call and then added to the conference bridge where the customer can talk with the other conferees on the bridge.

When dial-up type conference arrangements are under the control of an operator, the operator's position can be furnished with supervisory equipment to permit the operator to monitor the status of each conference leg on the bridge in order to ascertain when a conferee answers, disconnects or is added to the bridge. Thus, the operator can inform the conferees on an existing conference when a new party is to be added to the bridge.

If the conference is controlled from a customer station it is generally not practical to provide each customer station with a supervisory capability similar to that of an operator's position.

Accordingly, if a customer is the conference originator, he or she can dial up each conferee and inform the conferee of the conference before the conferee is added to the bridge. Those conferees already connected to the bridge, however, will not be aware of the newly added party unless the new party announces his or her presence. This method of adding a conferee unannounced may be disruptive to the existing conference since the added conferee may be added during a private conversation on the bridge which was not meant to be heard by the newly added conferee.

SUMMARY OF THE INVENTION

The foregoing problem is solved, and a technical advance is achieved by a customer operated dial-up conference arrangement which automatically informs the parties on an existing conference when a new conferee is to be added.

More specifically, as each new conferee is added to an existing conference bridge, a warning signal is applied to the bridge to inform the existing conferees that a new conferee is about to be added. The system then delays the connection of the new conferee for a prescribed period of time to allow the conferees existing on the bridge to terminate their conversation before the new conferee is added to the bridge.

In accordance with a feature of the invention, the tone is applied to the bridge in a "broadcast" mode to assure that all conferees existing on the conference can hear the tone.

Additionally, and in accordance with another feature of the invention, the warning signal comprises a plurality of tones having different frequencies to differentiate between a conferee being added to the bridge and a conferee disconnecting.

BRIEF DESCRIPTION OF THE DRAWING

FIGS. 12–21 show a flow diagram of the overall operation of the system; and

FIG. 22 shows the legend of the symbols used in the flow diagram.

GENERAL SYSTEM DESCRIPTION

Figure 1:
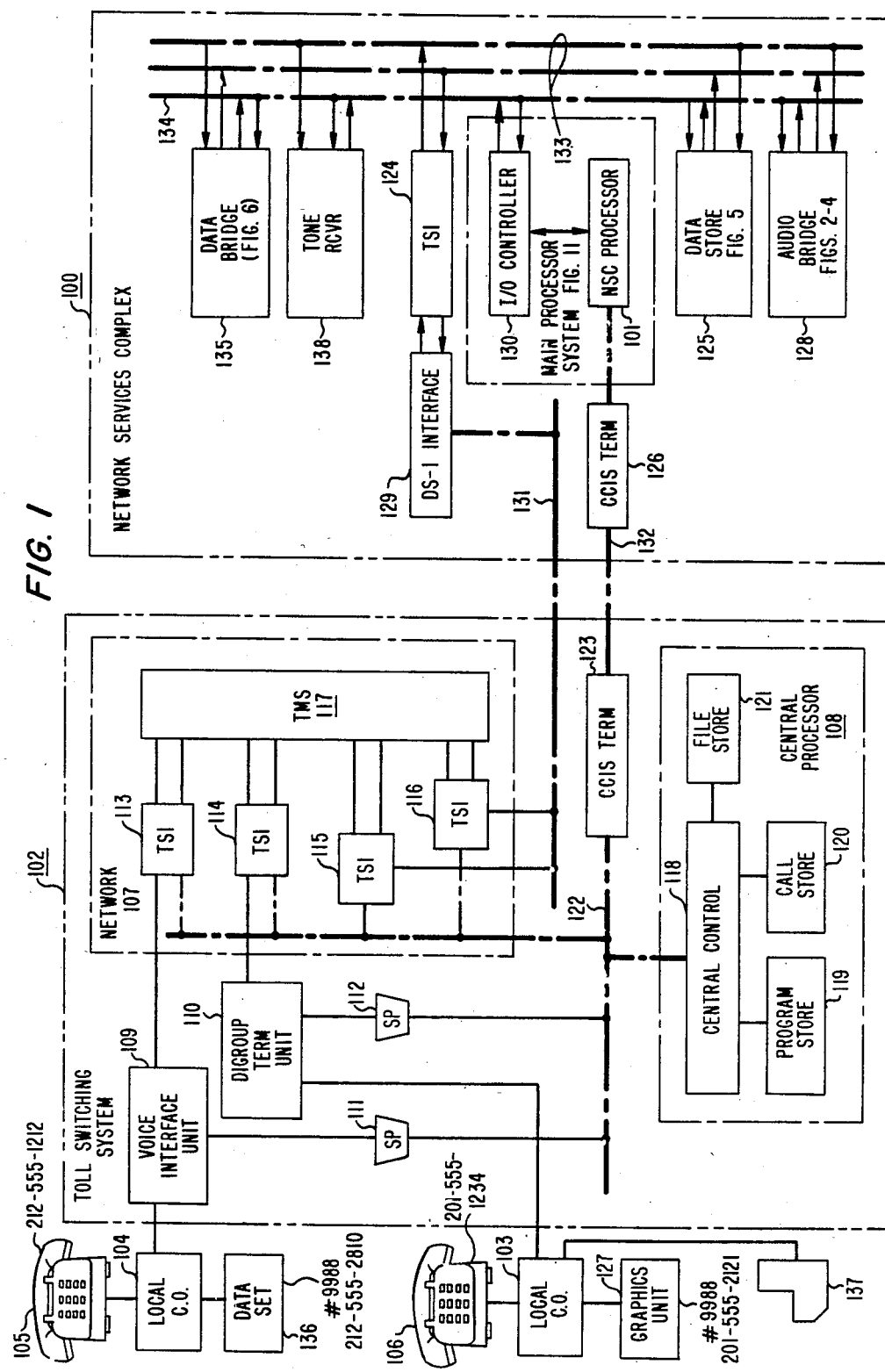
FIG. 1 shows a block diagram of a telephone network having a toll switching system equipped with a network services complex for providing conference services.

The general organization of a system employing the invention is illustrated in the block diagram of FIG. 1 which shows a typical communications network having a toll switching system 102 which serves local telephone central offices 103 and 104. Central offices 104 and 103 contain the switching apparatus for providing telephone service to customer stations 105 and 106, respectively and data service to data set 136 and graphics unit 127. Also connected to central office 103 is teleconference operator position 137. Connected to switching system 102 is a network services complex 100 for providing special services such as audio/data conferencing.

Network services complex 100 includes NSC processor 101, data store system 125, input/output controller 130, audio bridge system 128, data bridge system 135, a plurality of tone receivers such as 138, and other units. As will be described in more detail below, one of the functions of complex 100 is to provide audio/data conferencing with announcements and instructions to customers over the telephone network via the toll and local switching offices.

Toll switching system 102, as depicted in FIG. 1, is a typical electronic switching system, such as, the system described in detail in the *Bell System Technical Journal*, Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113-116 and time multiplex switch (TMS) unit 117.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 is connected to the toll office over the digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 provides the scan, distribute and digit reception tasks for analog trunks, signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. A typical processor suitable for use in the illustrative toll switching system is described in the *Bell System Technical Journal*, Vol. 56, No. 2, February 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal,* Vol. 57, No. 2, dated February 1978, and is represented herein by CCIS blocks 123 and 126 and data link 132.

Coupled to the toll switching system is the network services complex 100 comprising a main processor system including NSC processor 101 and input/output controller 130, a data bridge system 135, an audio bridge system 128, CCIS terminal 126, DS-1 interface 129, time slot interchange 124, data store announcement system 125 and a plurality of tone receivers, such as 138. Network services complex 100 can also include other units such as additional audio conferencing bridges, speech recognition systems, data processing units, etc.

The network services complex is disclosed in U.S. Pat. No. 4,475,189, which issued to D. E. Herr, R. Metz, L. E. Suk, P. R. Wiley and D. F. Winchell on Oct. 2, 1984, and the reader is directed to that disclosure for a more detailed description of the network services complex. In order to appreciate how the present invention is utilized in a system such as the network services complex, a brief overview of the complex and its various subsystems will be given herein, but it will be obvious to one skilled in the art that the present invention is equally applicable to other conference systems without departing from the spirit and scope of the invention.

It is intended that network services complex 100 function with many different types of switching systems to provide several special services in addition to those mentioned above. As such, complex 100 has been designed to connect to a switching system via conventional interoffice trunks 131 and a CCIS type data link 132. The interoffice trunks 131 serving complex 100 are digital facilities similar to the trunks between toll office 102 and local office 103 as described above and the data link 132 and its terminals are similar to those described in the 1978 *Bell System Technical Journal* cited above. Although these terminals are referred to as CCIS terminals, it is not essential that they be integrated in the CCIS signaling system used for call processing in the network.

The network services complex is modularly designed to allow for various service units to be added. All units are interconnected over a data bus 133 and a control bus 134. The control bus is used by the NSC processor 101 to communicate control, status and error information with the various units in the complex. Program associated data, billing data, etc., which is distinguished from customer data to be conferenced, is also transmitted over control bus 134. Data bus 133 consists of a transmit bus and a receive bus and each bus is a 256 time slot, time-multiplexed PCM data bus.

Interface 129 connects the T1 trunks from toll switching system 102 to time slot interchange unit 124 which under the direction of processor 101 switches any time slot in the receive T1 bus or the transmit portion of data bus 133 with any time slot on the T1 transmit bus or the receive portion of data bus 133. Thus, the interface 129, time slot interchange 124, and bus 133 provide the path for the exchange of voice, data, announcements and inband signaling between the toll switching system 102 and units of the network services complex.

The network services complex 100 is controlled by NSC processor 101 which performs or initiates all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For purposes of illustration, let it be assumed that the complex is equipped for dial-up audio/data conferencing with voice prompting. Accordingly, the complex comprises an audio bridge system 128 which is used for combining the digital voice samples of speakers on a conference for distribution to other participants of the conference. Data bridge system 135, on the other hand, receives data from each conferee's data terminal and distributes the data to the other conferees at the correct speed, in the proper format, etc. The term, data, when used with respect to information transmitted by a customer, is meant to include digital representations of video signals, facsimile, signals from devices such as electronic chalk boards, etc., which is separate from the voice and tone signals transmitted by the customer.

Network services complex 100 also includes a data store system 125 for furnishing tones and announcements to instruct the customers in the use of the special services, and a tone receiver 138 which receives the tone signals representing digits generated by the customer in establishing and controlling a conference.

The control interface between the network services complex systems and the toll switching system 102 is via a main processor system including NSC processor 101, input/output controller 130, and terminal 126. It is via this path that orders are exchanged between the network services complex and the toll switching system.

DS-1 interface 129 in this embodiment provides an interface for up to five T1 trunks (120 channels or time slots) which terminate on time slot interchange unit 124. The time slot interchange unit in turn, functions to switch these circuits with 256 time slots on time multiplexed data bus 133 to interconnect the channels with the various service units in network services complex. Thus, voice, data, and signaling information incoming over the toll telephone network from a conferee is forwarded via interface 129, and time slot interchange 124 to the audio and data bridges for conferencing or to the tone receiver for digit detection and collection while announcements and tones from data store system 125 and conference data from the bridges are transmitted back via the time slot interchange over the toll network to the conferees.

Conference calls are established by using a conventional telephone station and dialing a special conference code assigned to the conferencing service. To facilitate end-to-end signaling, it will be assumed that the customer station is equipped with a keyset for generating dual-tone multifrequency signals.

The telephone call is handled in the usual manner through the network and routed according to the dialed digits to the nearest toll switching system equipped for conferencing, such as system 102. Toll switching system 102 accesses the network services complex by transmitting a message over data link 132 to terminal 126 and ascertains if conferencing facilities are available. If facilities are available, the call is handed off to the network services complex by extending the conference originator's talking path via a channel in T1 carrier link 131, time slot interchange 124 and over the time multiplexed data bus.

Recognizing a request for a conference, NSC processor 101 requests an identification of the calling line and transmits an order over bus 134 to data store system 125 ordering a particular message prompt to be played to the customer. This prompt would advise the customer that he/she is connected to a conference facility and request the customer to dial certain codes to indicate whether or not the voice bridge will be used for a special service. The prompt would also ask the originator how many parties will be included in the conference.

Data store system 125 responds to the order from processor 101 by loading the appropriate messages in a playback buffer and transmitting the messages over the time multiplexed data bus 133 and time slot interchange 124 to the conference originator. Processor 101 also causes a tone receiver 138 to be connected in a different time slot over the time multiplexed data bus to the conference originator. The receiver monitors the originator's line for the reception of tones from the caller.

The customer now dials (keys in) the codes satisfying the requirements for his/her conference. Tone receiver 138 detects each digit and forwards it to processor 101. Assuming that this is a combined audio/data conference, processor 101 reserves audio ports in bridge system 128, data ports in bridge system 135, and then sends an order to the data store system 125 causing the next message prompt to be transmitted to the originator.

This prompt will tell the conference originator the code that should be dialed followed by the telephone number of the conferee to be added to the conference. As each telephone number is received via the tone receiver 138 and forwarded to processor 101, processor 101 initiates a call over its data link 132 to toll switching system 102 requesting that the toll switching system establish a call to the designated conferee and connect that conferee to a channel selected in T1 link 131.

As each leg is established under the direction of processor 101 and the called conferee answers, the conference originator can converse privately with the conferee announcing that he/she is about to be added to the conference. Similar legs are established from data bridge system 135 to the data terminals of each conferee.

In accordance with a feature of the invention, a warning signal is connected to the audio bridge prior to adding a conferee to the conference. This informs the conferees on the bridge that a new conferee is about to be added. The system then delays the addition of the new conferee to allow the existing conferees time to terminate their conversation.

DETAILED DESCRIPTION

The invention can better be understood by a more detailed description of each of the major elements of the apparatus as shown in FIGS. 2-11 followed by a description of the sequence of operation of the equipment with respect to the flow diagrams in FIGS. 12-21.

1. Main Processor System

Figure 11:
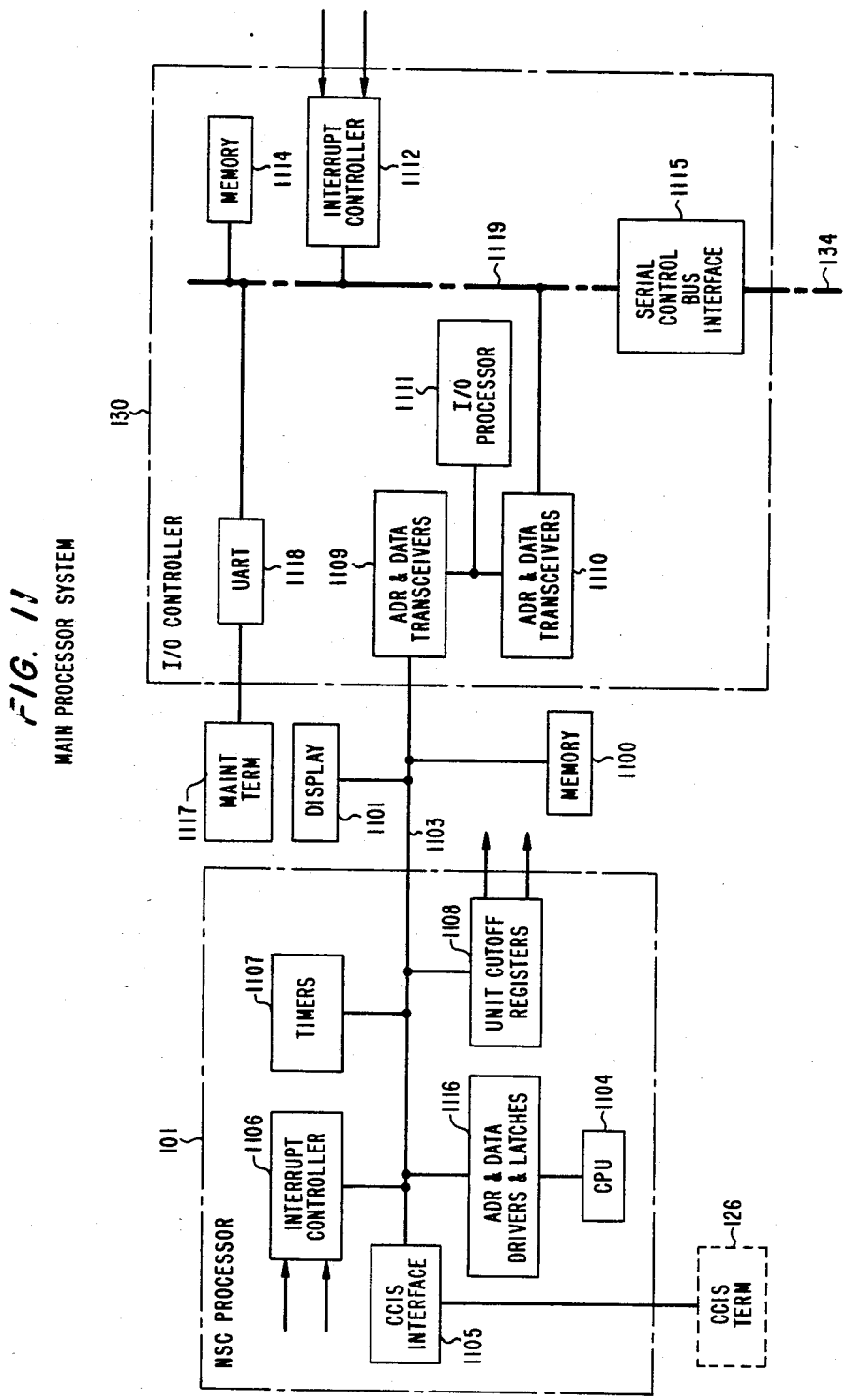
FIG. 11 shows the main processor system of the network services complex.

The main processor system for the network services complex is shown in more detail in FIG. 11. The main processor system comprises NSC processor 101, memory 1100, input/output controller 130, and display 1101 which are interconnected over system bus 1103. The main processor system is a distributed processor which is responsible for all call processing, maintenance, fault recovery, certain diagnostics and audits for the network services complex as a whole. The main processor system also keeps track of all system resources such as what ports are assigned to a particular conference, the status of all ports and receivers, the identification of available announcements, etc.

Communication with the toll switching system 102 is via terminal 126 which accesses processor 101 via a direct memory access channel, and processor 101 distributes orders to and receives replies from the peripheral service units (such as the data bridge, the audio bridge, etc.) via input/output controller 130 which acts as a direct memory access controller for the processor. Using a shared area of memory 1100, controller 130 transfers messages between the peripheral service units and processor 101.

The units within the main processor system communicate via system bus 1103 in a master-slave relationship. Central processing unit (CPU) 1104, I/O processor 1110, and a memory refresh controller (not shown), act as masters with the other units acting as slaves. Contention between bus masters is resolved by a bus arbiter arrangement in a well-known manner.

The NSC processor 101 comprises CPU 1104, interrupt controller 1106, interface 1105, timer 1107, and unit cut off registers 1108.

Interrupt controller 1106 responds to signals from equipment such as timer 1107 and controller 130. It will be noted that CCIS interface 1105 resides on the system bus to permit any master on the bus to access a random access memory (RAM) which resides in the terminal 126.

As mentioned above, the serial control bus 134 interconnects the main processor system with the peripheral service units for control information and time multiplexed data bus 133 interconnects the units for data flow. These units can be disabled and forced off the bus by unit cut off registers 1108 under the direction of CPU 1104.

The input/output controller 130 acts as a direct memory access controller for memory 1100 and all service unit operations. In addition, it permits maintenance personnel to access the system via a maintenance terminal 1117. I/O processor 1111 accesses its own resident bus 1119 via address and data transceivers 1110, and it accesses the system bus 1103 via address and data transceivers 1109.

I/O processor 1111 has its own memory 1114 for program storage and its own interrupt controller 1112. It is via interrupt controller 1112 that the peripheral units such as the audio bridge, data bridge, etc., gain access to main processor system of the network services complex.

All communication of the control information between the main processor system and the other units of the complex is via serial control bus interface 1115 and control bus 134. The main processor system units acts as a master on the control bus with the audio bridge system, data bridge system, data store system tone receivers, time slot interchange unit, etc. acting as slaves. Messages from the main processor system are formatted with a destination address of the peripheral system to which the message is directed, followed by an operation code which specifies the function of the message and a data field containing the contents of the message. If a peripheral unit such as the data bridge wishes to utilize the control bus 134, it signals over a dedicated interrupt lead to interrupt controller 1112, and the main processor system can grant control of the bus with the next message it sends over the bus.

2. Data Store System

As mentioned above, data store 125 is provided to furnish tones and announcements over the telephone network to instruct customers in the use of the special services furnished by the network services complex. In general, data store 125 receives requests for announcements in the form of orders from NSC processor 101 over control bus 134, acknowledges the requests and plays the announcement back over bus 133 in a time slot designated by processor 101.

The apparatus of data store 125, which will now be described in general terms, is more fully disclosed in FIG. 5, in the copending application of T. W. Anderson, R. J. Milczarek, and C. H. Peters, Ser. No. 380,511, filed May 21, 1982 and in the above-identified patent of D. E. Herr et al., the reader is directed to these disclosures for a more detailed description of a data store suitable for use in the present invention.

Figure 5:
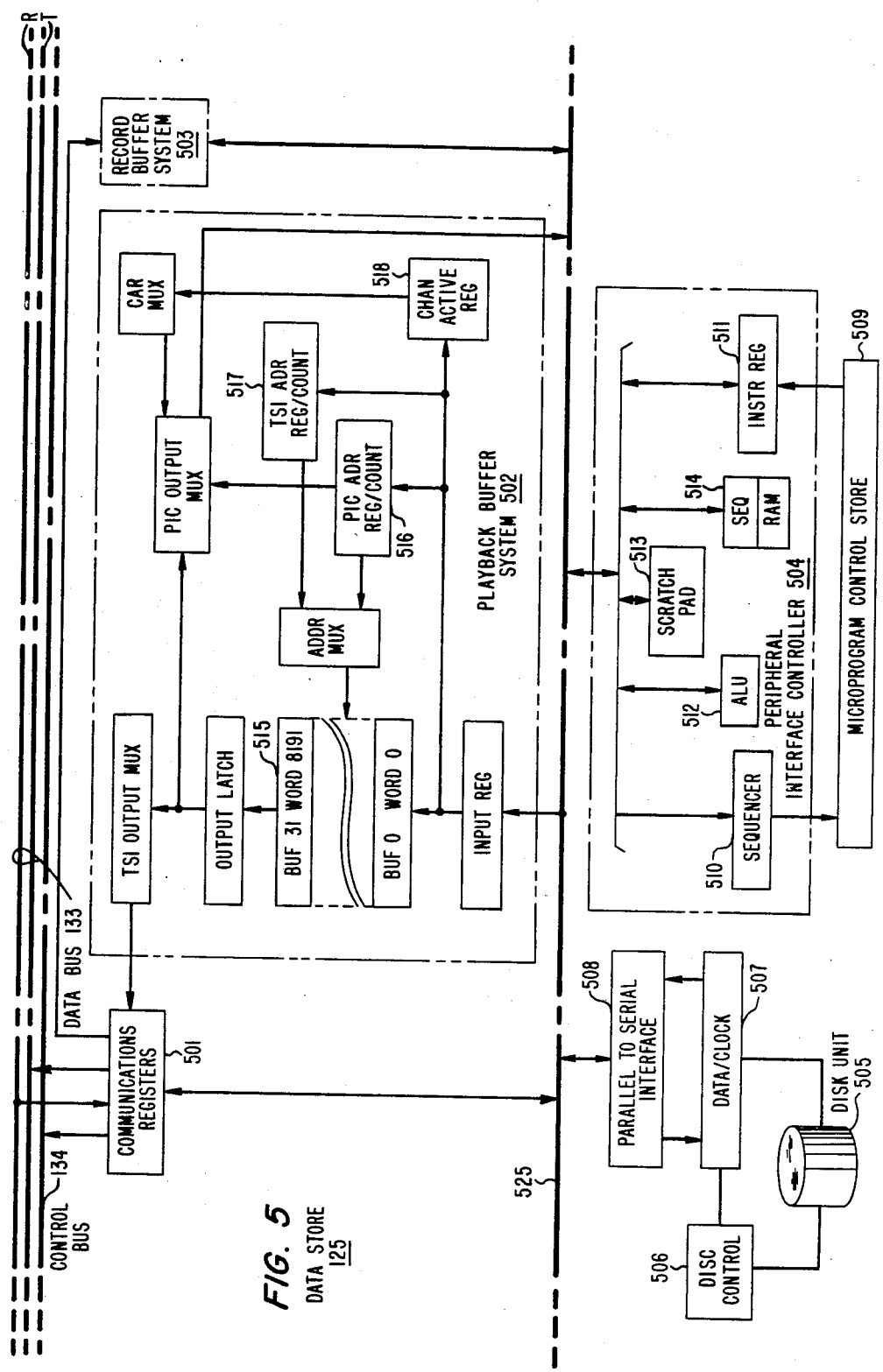
FIG. 5 shows a more detailed block diagram of the data store used for generating tones and for storing announcements for the network services complex.

As shown in FIG. 5, data store 125 is a processor controlled facility comprising a plurality of communications registers 501, playback and record buffer systems 502 and 503, peripheral interface controller 504 and disc unit 505 with its associated control, data/clock and parallel/serial interface units 506-508. Audio information transmitted from time slot interchange 124 (shown in FIG. 1) via 8-bit serial/parallel multiplexed bus 133R is received in record buffer system 503 in encoded PCM format. Similarly, audio information, such as tones and announcements, are played back via playback buffer system 502 and transmit bus 133T to time slot interchange 124.

Orders received from NSC processor 101 and replies generated by peripheral interface controller 504 are transmitted over control bus 134.

Orders for the play back of various messages which are stored in disc unit 505 are executed by reading from sectors of the disc 505 into a plurality of the playback buffers of the playback buffer system. In this embodiment, each playback buffer can contain up to two seconds of information for each playback channel and the data store as a whole can accommodate up to 32 channels of play back, with seven of these allocated to playing repetitively, two-second announcements and signals such as a tone. The 32nd channel is used for internal maintenance.

Each playback channel of the data store will be assigned a time slot on bus 133T and of course, a plurality of data stores, such as 125, can be added to the bus to increase the overall voice storage and playback channel capacity of the network services complex.

In playing back announcements which are used to prompt the customer in the use of the network services complex, the main processor system sends an order over control bus 134 requesting a particular announcement be played in a particular time slot on time multiplexed data bus 133. At the same time, processor 101 causes the information on that time slot to be transmitted via TSI 124 over a time slot associated with the originator, to each of the conferees or to whoever is to receive the announcement.

In response to an order from processor 101, data store functions autonomously to load the proper announcements from disc unit 505 into the playback buffer associated with the time slot designated by processor 101 and peripheral interface controller 504 reports back to NSC processor 101 that the announcement has been played back as ordered.

While the term "announcement" has been used herein with respect to data store 125, it will be understood that the data store can also have various tones stored therein for playback over the network.

3. Audio Bridge System

Figure 2:
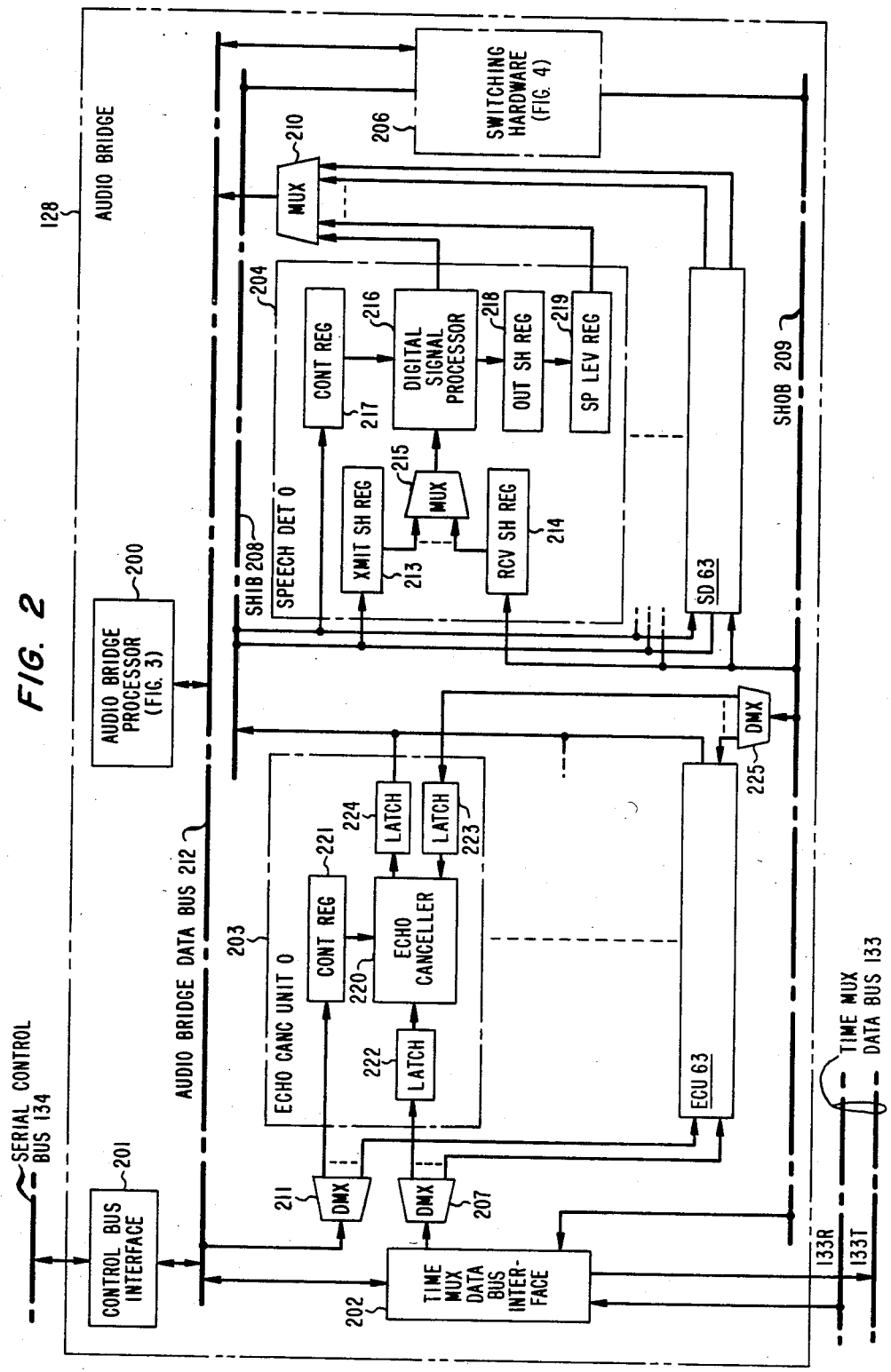
FIGS. 2–4 show a more detailed block diagram of the audio bridge portion of the network services complex with FIG. 3 showing the audio-bridge processor and FIG. 4 showing the audio bridge switching hardware.
Figure 3:
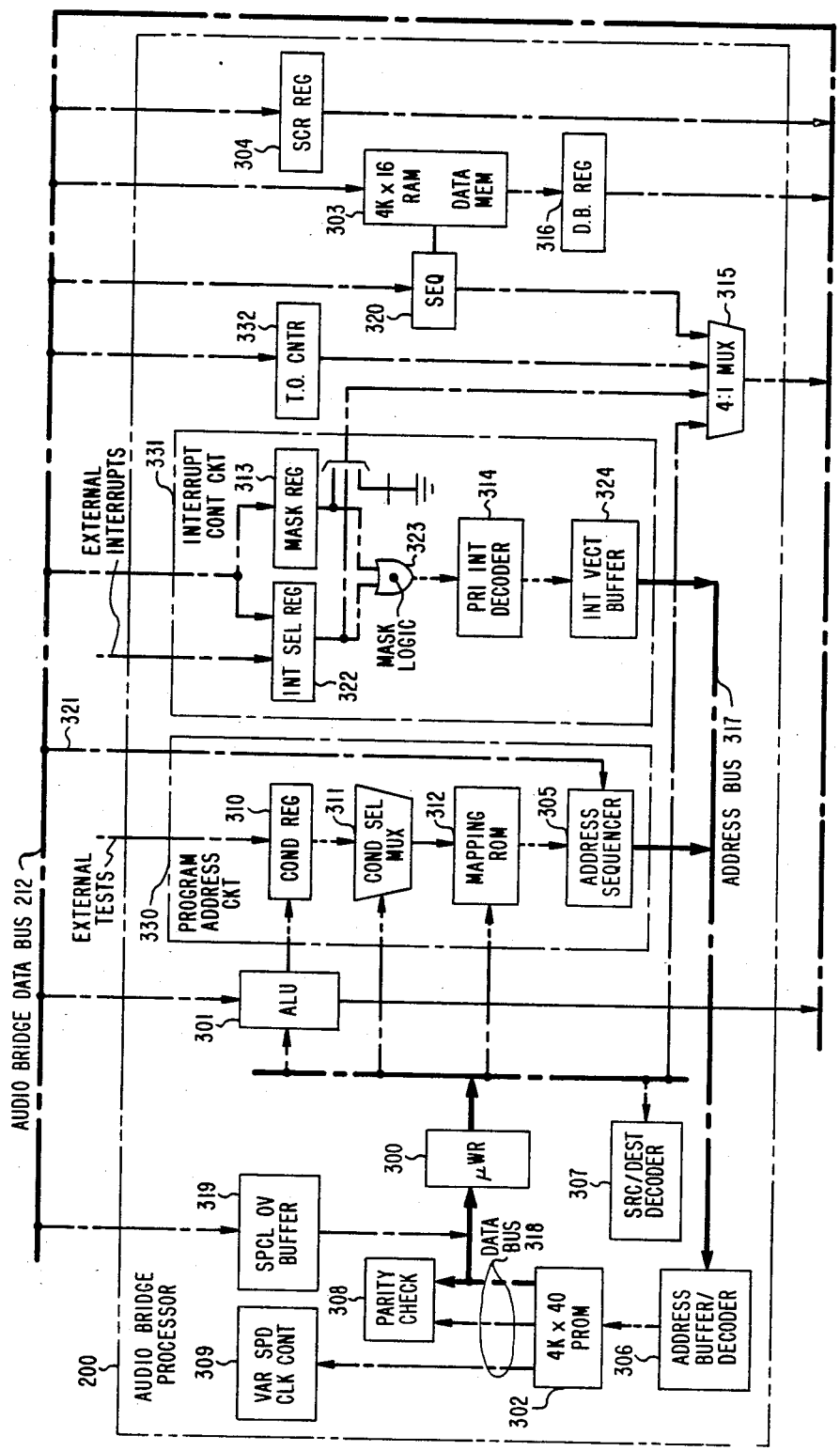
Figure 4:
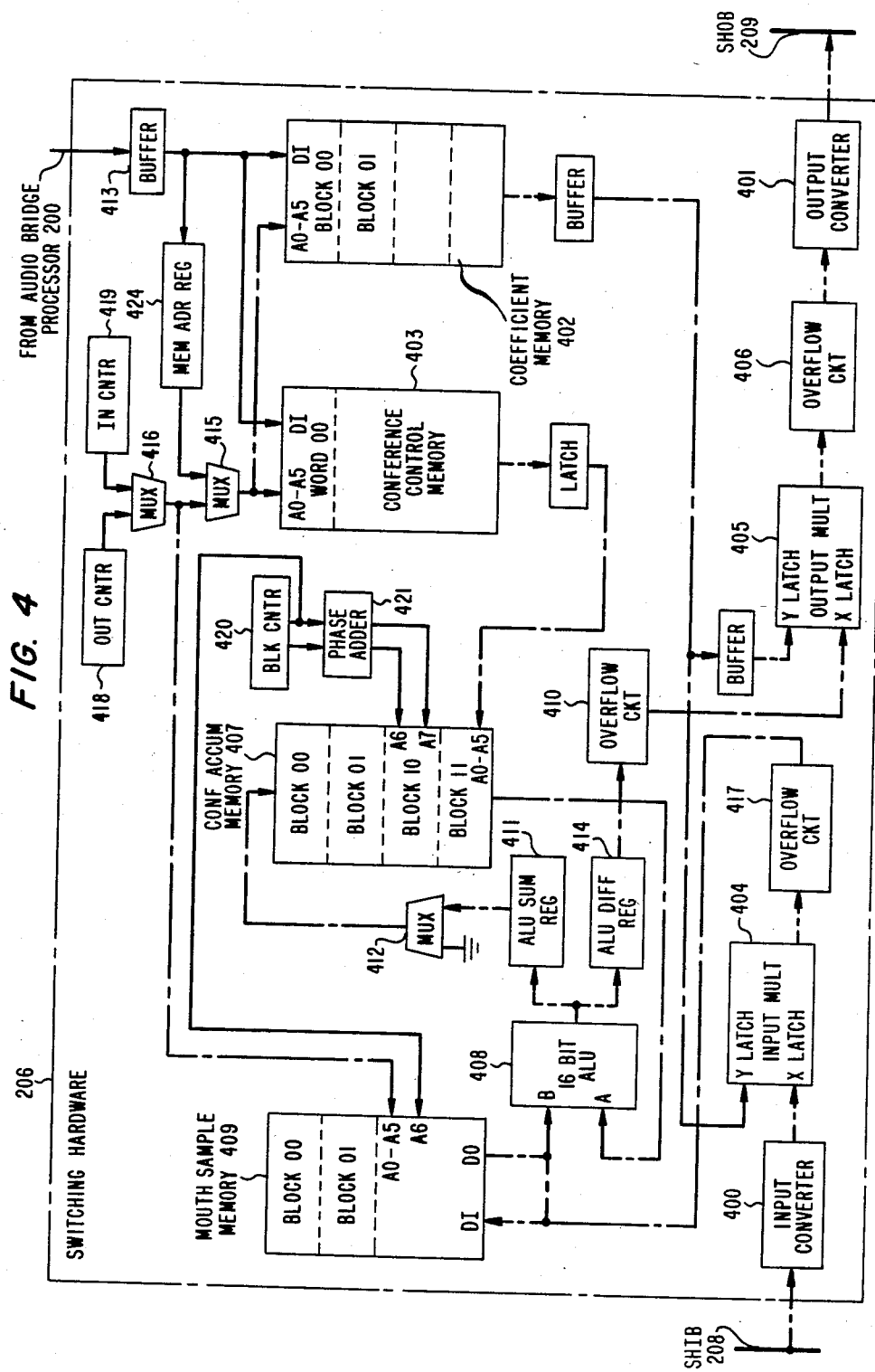

The audio bridge conference system is a multiport digital conference arrangement and is illustrated in more detail in the block diagram of FIGS. 2-4. As shown in FIG. 2, the conference arrangement comprises an audio bridge processor 200, bus interfaces 201 and 202, a plurality of echo canceler units such as 203, a plurality of speech detectors such as 204, and switching hardware 206. A speech detector and an echo canceler are provided on a per-port basis to detect and measure the level of speech and to control the amount of echo, respectively. During each time frame, each port is monitored for information (speech) samples above a threshold level. Upon detecting a threshold level sample, the speech detector for that port generates two control signals. One is speech/no-speech indication which designates the port as having a threshold level sample and the other is a speech level estimate which is used for port selection and automatic level control. The audio bridge processor scans the speech detectors for these signals once each base cycle of operation to direct the switching hardware to include in the output sample only input samples from selected, designated ports. With one conferee speaking, only the input sample from that speaker is included in the output sample. With more than one conferee speaking simultaneously, the switching hardware sums the input sample from each speaker together to form the output sample.

Communication within the audio bridge between the audio bridge processor and other units is via audio bridge data bus 212. The audio bridge communicates with the rest of the network services complex, and therefore, the telephone network via serial control bus 134 and time multiplexed data bus 133. It is over serial control bus 134 that the audio bridge receives orders from and sends replies to NSC processor 101 for establishing and controlling conferences. Time-multiplexed data bus 133, on the other hand, comprises a transmit and a receive leg for handling the samples of speech to be summed and distributed for each conference.

Audio bridge processor 200 (shown in more detail in FIG. 3) performs all common arithmetic, logic, and sequence control operations and also controls the status of the conference by writing control information into the switching hardware control memory shown in FIG. 4.

Switching hardware 206 shown in more detail in FIG. 4, performs three major functions in the conference arrangement, namely, it sums the speech samples from the time slots (ports, channels) into their respective conferences to form an output sample for each conferee, implements noise and automatic level control on incoming speech samples, and implements echo control by switching loss into the speakers receive path when echo cancelers are not effective. The audio bridge processor 200 controls these functions by writing the coefficient memory of the switching hardware with appropriate coefficients.

Having described the bridge hardware, a brief description of the flow of speech samples through the bridge is in order. During each time frame, 64 time slots of PCM data enter the audio bridge via time-multiplexed data bus 133. Speech samples are first sent to an echo canceler such as 203 where various degrees of echo suppression may be performed and then to the switching hardware which sums the incoming speech samples and distributes the resulting combination to each port in a conference.

A speech detector for each of the 64 ports (i.e., time slots, channels) monitors the speech samples going into the switching hardware and generates a speech/no-speech (busy/idle) indication and a speech level estimate. An eight-bit number in a speech level register such as latch 219 represents the speech level estimate or more particularly, the energy level on the port, whereas, the digital signal processor generates the speech/no-speech indication. The audio bridge processor scans each speech detector every base cycle to obtain the speech/no-speech indication and the speech level estimate. These are then used by a conference processing program to select which ports of a conference are enabled on the bridge. Samples from an enabled port are included in the resulting output sample distributed to each port of the conference. In addition, NSC processor 101 can designate certain ports as "attendant," "listener," "broadcast" and "normal." In the attendant and broadcast mode, the speech sample on that port will always be included in the summation.

For a further detailed description of the audio bridge system the reader is directed to the following patents in addition to those cited above: U.S. Pat. No. 4,475,190, dated Oct. 2, 1984 to M. A. Marouf-P. W. Vancil, and U.S. Pat. No. 4,479,693 to A. H. Bass-J. G. Blaschak-M. A. Marouf-P. W. Vancil-D. F. Winchell, dated Oct. 23, 1984. Of course it will be obvious to those skilled in the art that the present invention is suitable for use with other conference arrangements without departing from the spirit and scope of the invention.

4. Data Bridge System

Figure 6:
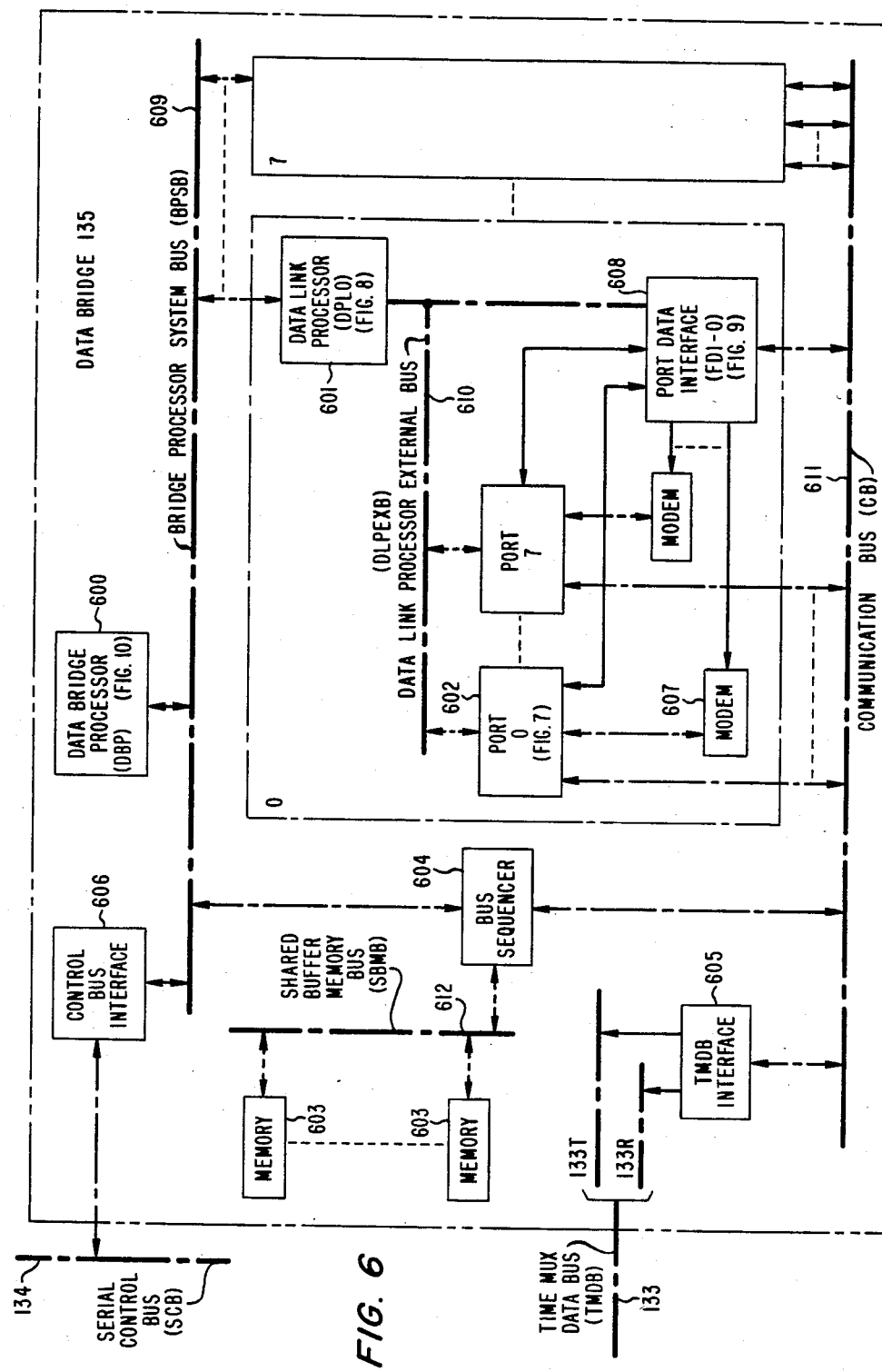
FIGS. 6–10 show the data bridge conference system of the network services complex with FIG. 7 showing a typical data port, FIG. 8 showing a typical data link processor, FIG. 9 showing the port data interface and FIG. 10 showing the data bridge processor.
Figure 7:
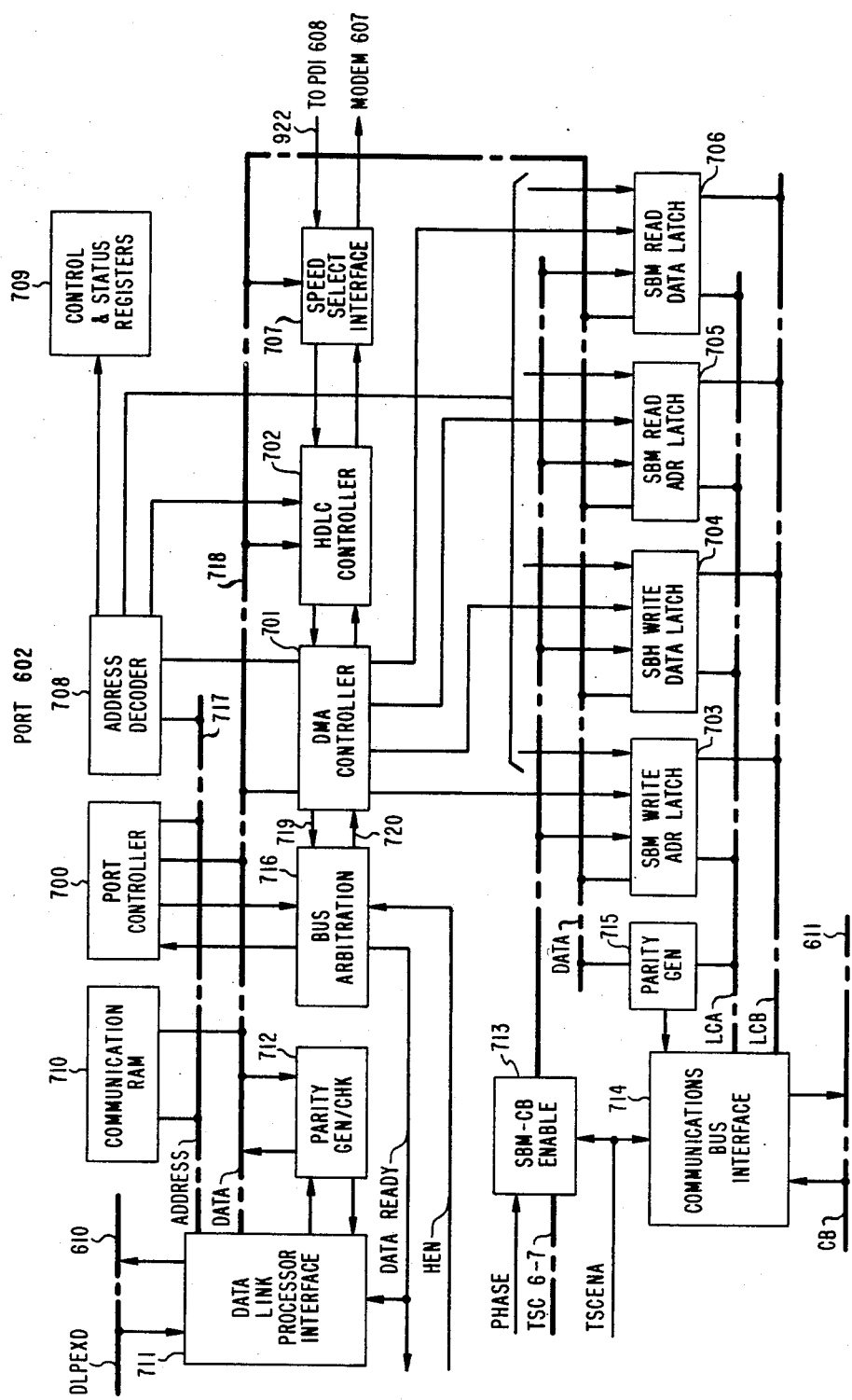

The apparatus of the data bridge is more fully disclosed in FIG. 6. As shown in FIG. 6, data bridge 135 comprises data bridge processor 600, a plurality of data link processors, such as 601, a shared buffer memory 603 and a bus sequencer 604. Associated with each data link processor is a port data interface, such as 608 and a plurality of ports, such as 602. In this illustrative embodiment, eight data link processors are provided in the data bridge and each data link processor is equipped to serve eight ports for a total of 64 ports per data bridge.

The data bridge interfaces with the network services complex via two buses, namely, the serial control bus 134 which handles the control functions and the time multiplexed data bus 133 which handles the data functions.

For illustrative purposes, it has been assumed that customers using the data bridge will communicate over the network trunks using at least two different modes of communication. Thus, some customers will use trunks that provide a 4.8Kb/sec half-duplex connection while other customers will use trunks that provide a full-duplex connection at a 56Kb/sec data rate.

Figure 10:
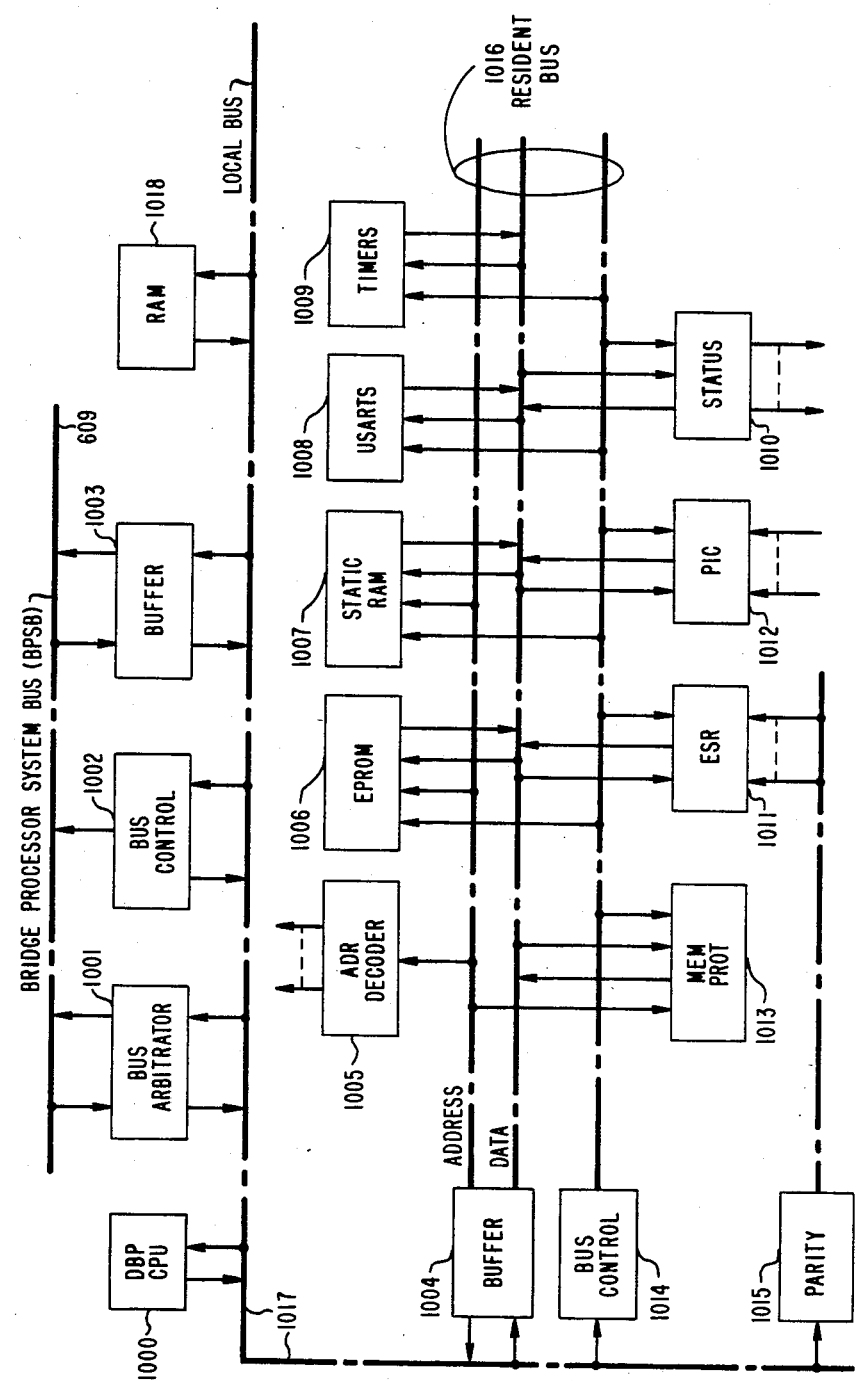

The data bridge processor 600 which is also shown in more detail in FIG. 10 is the main control processor for the data bridge system. It interfaces with NSC processor 101 via serial control bus 134 from which it receives conference configuration information and to which it reports conference status. Data bridge processor 600 is connected to the shared buffer memory 603 via the bridge processor system bus 609 and bus sequencer 604. It is from the shared buffer memory 603 that the data bridge processor 600 obtains session and document protocol data. Data bridge processor 600 can also access the various data link processors via bus 609 to control port configuration and monitor the port status.

Figure 8:
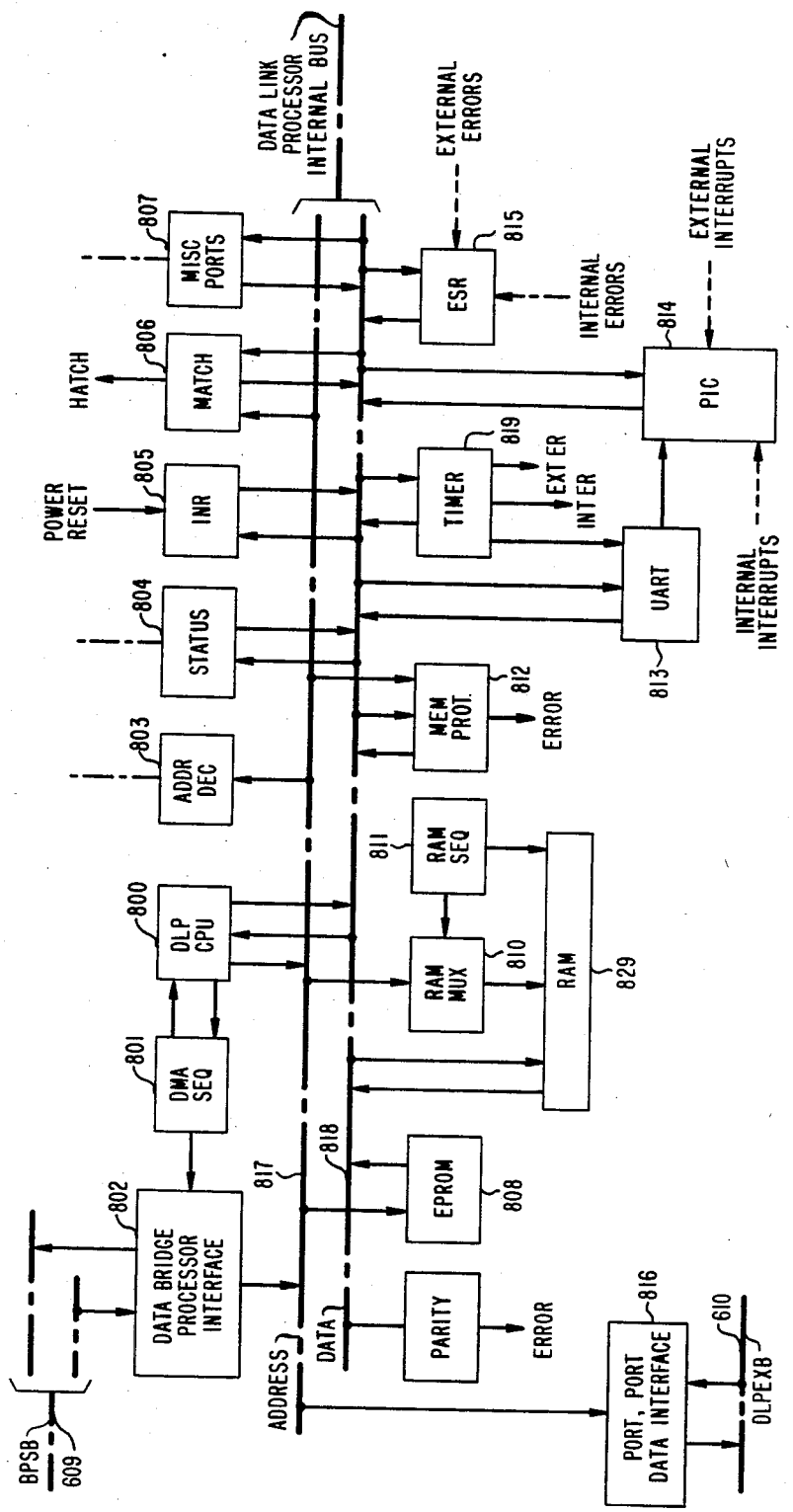

Each data link processor which is also shown in more detail in FIG. 8 interfaces with eight high-level data link control ports, such as port 602, to control the port configuration as commanded by data bridge processor 600. The data link processors also handle all link-level protocol procedures except synchronization, cyclic redundancy checking and bit insertion.

The ports, such as port 602, handle actual frame transmission and reception. The ports interface with a port data interface such as 608 from which they receive 56Kb/sec serial data and they interface with a modem such as modem 607 from which they receive 4.8Kb/sec serial data. The ports can also interface directly with the shared buffer memory on a time-shared basis via communications bus 611 to read out of the memory information to be transmitted over the network to a conferee or write into the memory data received from a conferee as directed by the associated data link processor.

Figure 9:
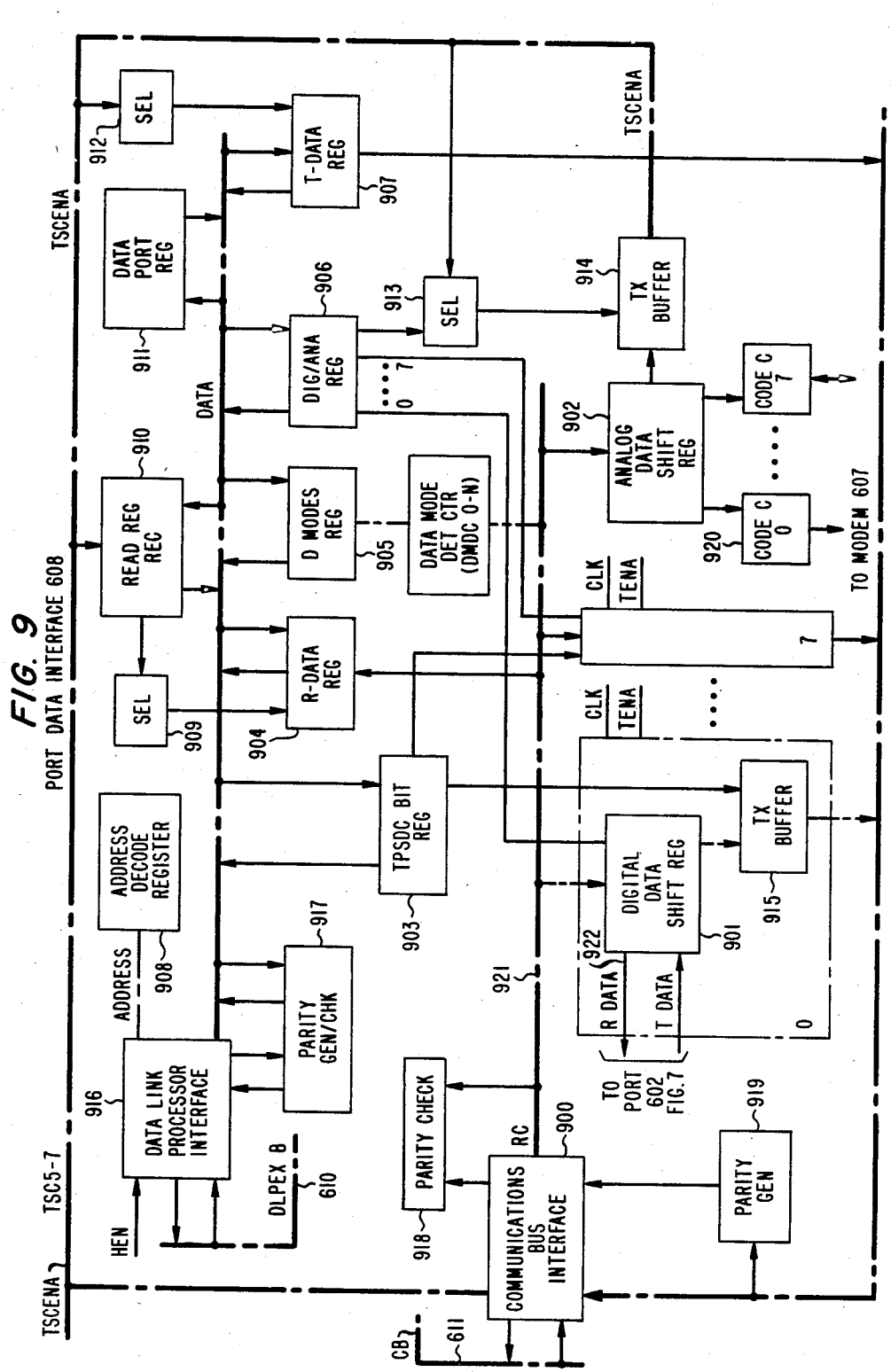

The port data interface 608 which is also shown in more detail in FIG. 9 functions with eight port units, such as port 602. The port data interface performs the function of interfacing the ports and the time multiplex data bus for the different modes of transmission utilized by conferees. Port data interface 608 receives data from and transmits data to the network services complex timeslot interchange frame 124 (FIG. 1) via the time multiplex data bus 133 and communication bus 611 at a 64Kb/sec rate compatible with the standard T1 trunks at the toll switching center 102.

Thus, the data stored in the shared buffer memory after being processed by the port data interface and the port is in the same format for all conferees regardless of the data rate that the conferee terminals were using. This data can then be extracted from the shared buffer memory by any port for transmittal to any conferee at the data rate compatible with that conferee.

The port data interface 608 as shown in FIG. 9 has seven control registers which can be accessed directly by the data link processor over bus 610, and these registers control the selection of data speed conversion and the transmission of an idle code on an idle channel as dictated by the data link processor 601.

The data bridge system is disclosed herein for illustrative purposes and a more detailed description of the data bridge can be found in the above-cited D. E. Herr et al. patent and in the U.S. Pat. No. 4,479,195 which issued to D. E. Herr, R. Metz, L. A. Russel on Oct. 23, 1984. Other data conference arrangements can also utilize the present arrangement without departing from the spirit and scope of the invention.

5. Sequence of Operations—Conference

The overall operation of the conference arrangement can best be illustrated by describing, with respect to the flow diagrams of FIGS. 12-21, the sequence of events that take place when a customer originates an audio/data conference call.

Figure 15:
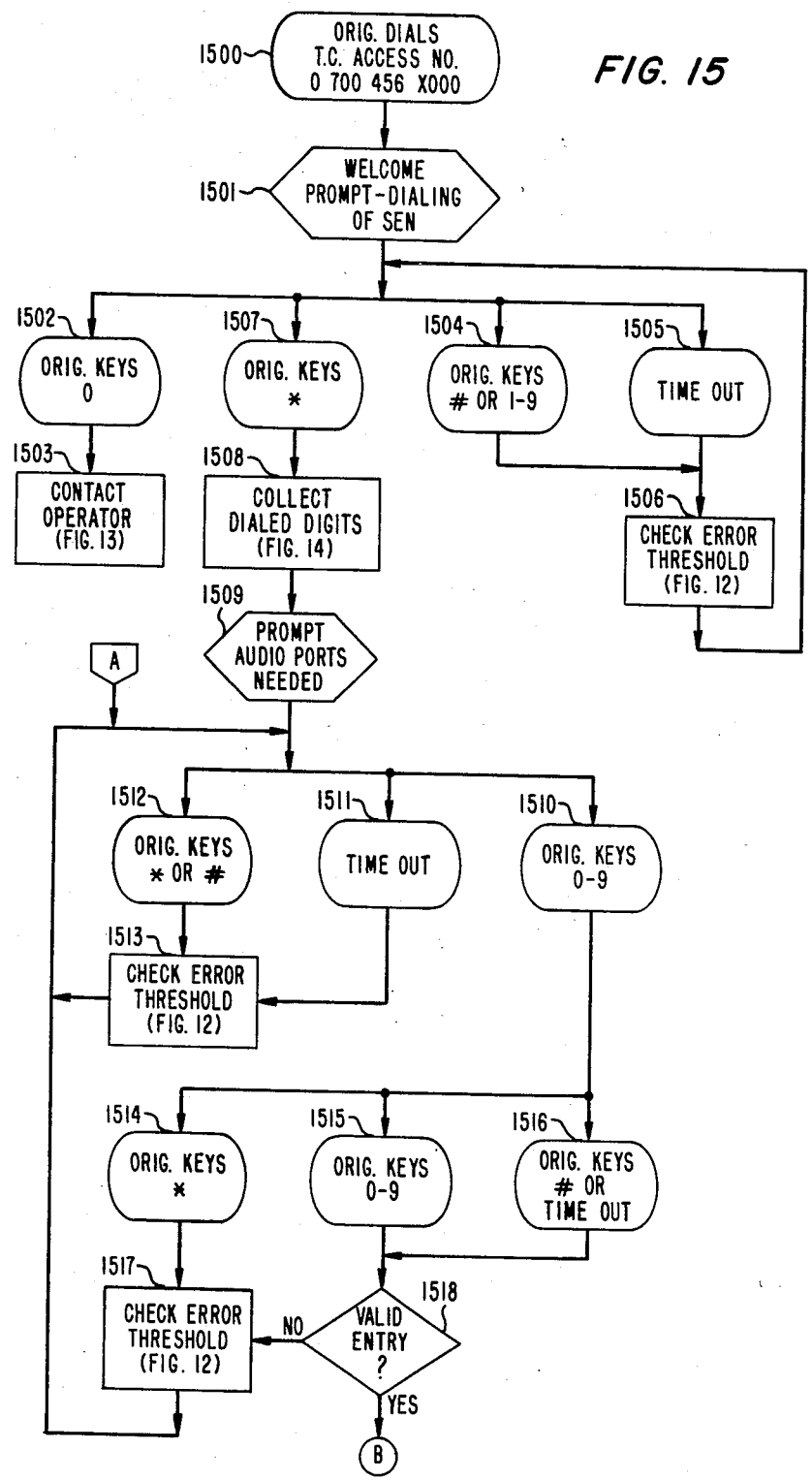
Figure 16:
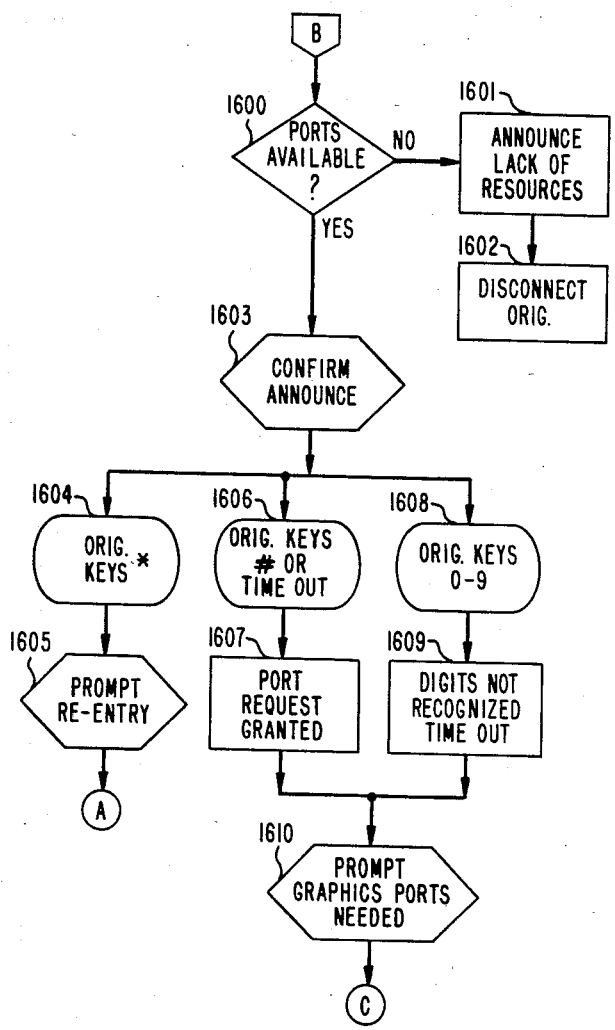
Figure 17:
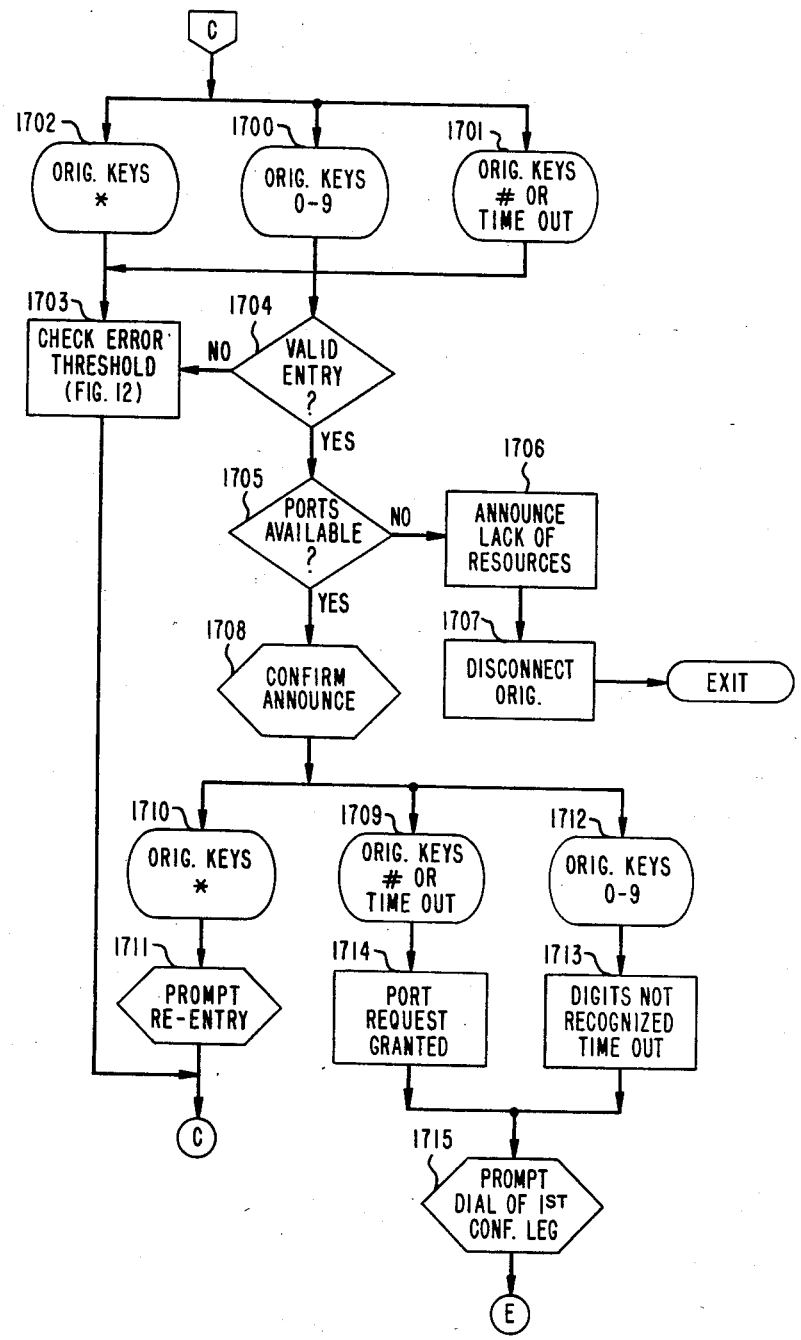
Figure 18:
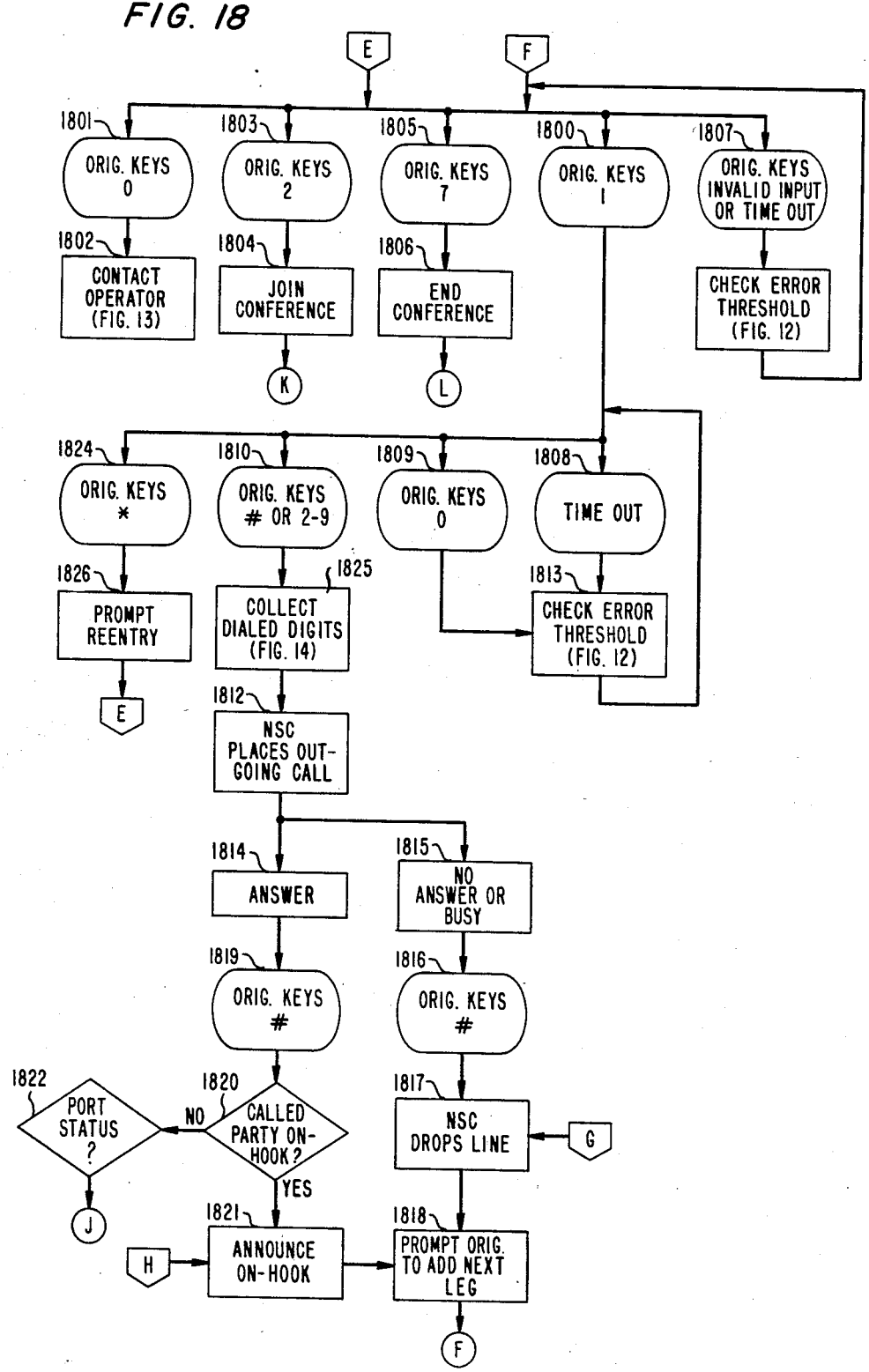
Figure 19:
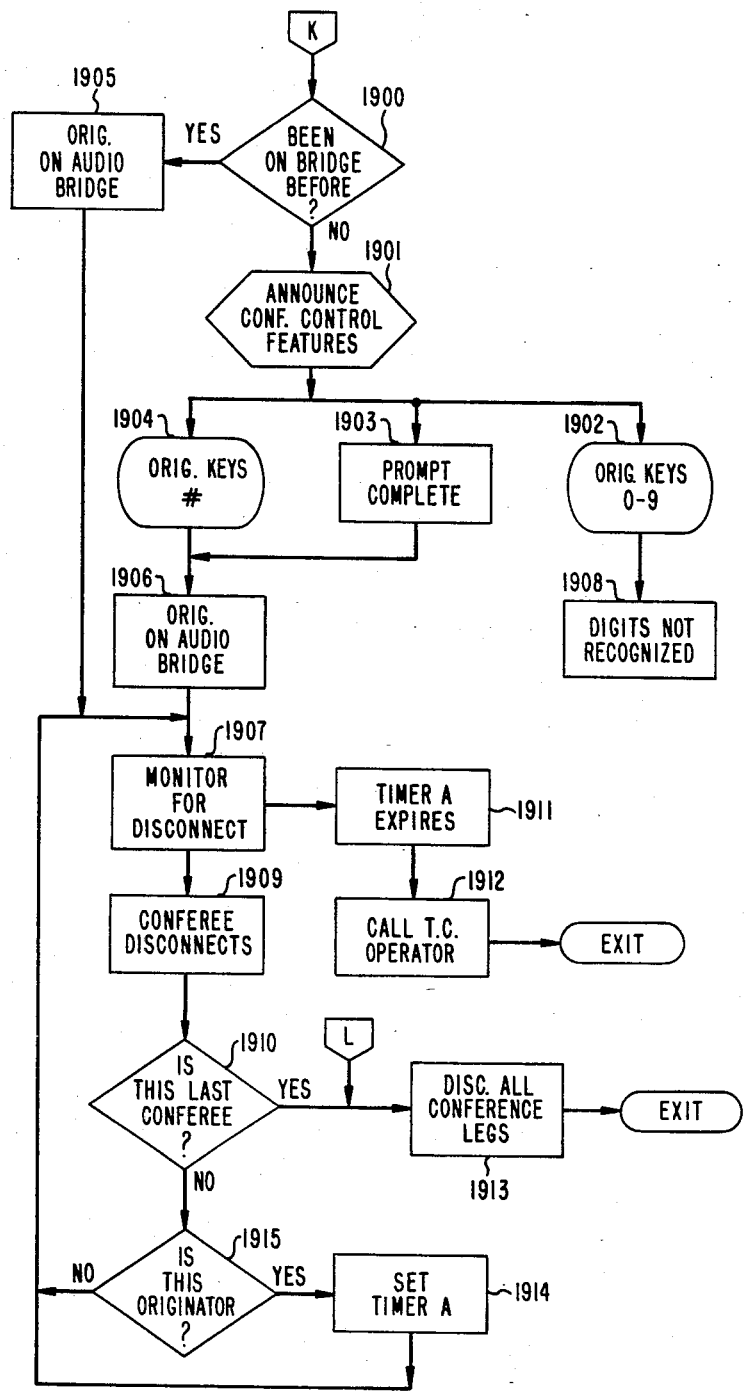
Figure 20:
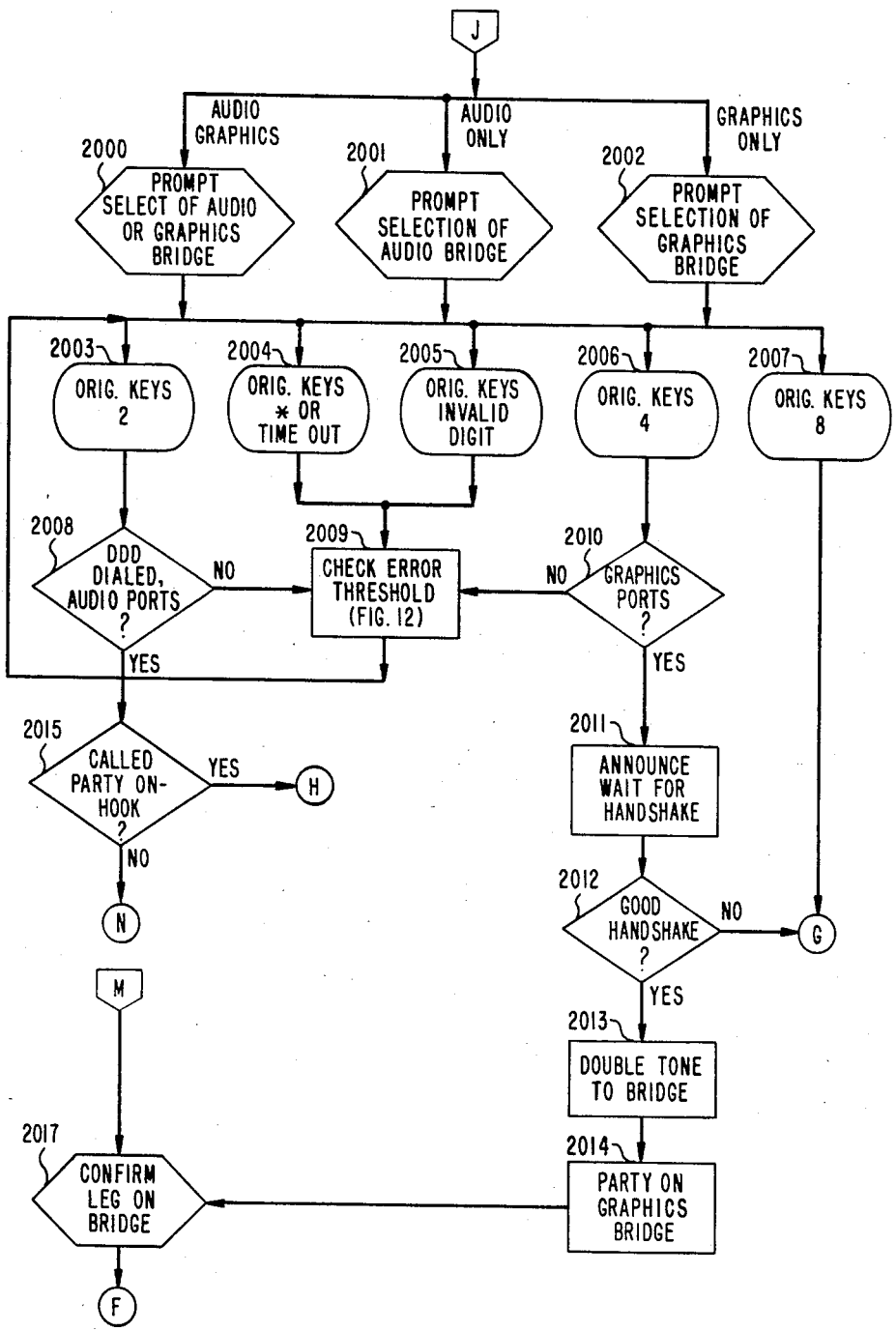

The conference originator begins by dialing into his/her local office a conference service access code of 10 or 11 digits, such as 0+700+456+X000, as shown in box 1500 of FIG. 15. The first digit might be used to route the call through a switching facility which enables the automatic identification of the calling customer for billing purposes. The next three digits provide a uniform code which identifies all special services such as those to be provided by the network services complex on a nationwide basis so that all customers within a wide geographic area utilize the same code. In the example being described, the digits 700 are used. The fifth through seventh digits (such as, "456") identify all teleconferencing services and the last four digits indicate the particular conference services, such as audio-only, audio/data, the size of the conference required, etc. For purposes of illustration, let it be assumed that the customer wishes to originate an audio/data conference.

The call is routed via the telephone network in a conventional manner to a toll switching system having a network services complex, such as toll system 102 shown in FIG. 1. Switching system 102 selects an idle trunk in the T1 link 131 and sends an initial address message over link 132 to the network services complex indicating that conference equipment is desired.

In response to the initial address message, network services complex processor 101 ascertains if it has sufficient conference resources to provide the service. It does this by examining tables in RAM 1100 which lists all of the available facilities along with their busy/idle status. Upon determining that sufficient conference facilities are available, processor 101 sends a message to switching system 102 over link 132 indicating that it will accept the conference call and requesting that the calling line be identified. Answer supervision is also returned to the originator's office at this time after the automatic number identification information has been received. The incoming T1 trunk in link 131 which is serving the conference originator is then connected via time slot interchange 124 to a playback buffer in data store 125, and processor 101 orders the data store to transmit a welcoming message to the conference originator. Processor 101 also orders the interconnection of tone receiver 138 to the trunk incoming from the conference originator in order to receive further digits transmitted by the originator.

As mentioned above, time slot interchange 124 provides the interconnection between communication channels in link 131 and the time multiplexed data bus 133. Thus, information received on any channel (i.e., time slot) in link 131 can be transmitted to any of the channels in the same link to provide a trunk-to-trunk connection. Similarly, information in any time slot of the time multiplexed data bus can be transmitted back via another time slot on the time multiplexed data bus to interconnect service circuits of the network services complex. An example of this would be connecting a playback buffer of the data store 125 to an audio bridge port to play an announcement over the conference bridge. Also, the information in any time slot of link 131 can be transmitted via a time slot of time multiplexed data bus 133 so that customers can be connected to a tone receiver, playback buffer, conference port, etc. Furthermore, communications can be fanned out by time slot interchange 124 so that an announcement transmitted from a playback buffer in data store 125 can be selectively transmitted via several time slots in link 131 so that many customers may hear the announcement.

The systems involved in this invention are time division systems and when the terms trunk, conference port, conference leg, channel, and similar terms are used throughout the specification, it will be understood that in actuality, the reference is being made to a particular time slot in one of the time multiplexed channels.

Returning now to a description of the operation of the system, when processor 101 interconnected the originator's incoming trunk with data store 125, it ordered time slot interchange 125 to connect the incoming trunk time slot in link 131 with a time slot in multiplexed data bus 133 that is associated with a designated playback buffer in the data store. At the same time, an order was sent over serial control bus 134 to the data store causing a welcoming message designated by the order to be played to the conference originator as shown in box 1501.

The welcoming message would inform the originator that he/she has been connected to a conference service and request the originator to dial a service entry number (SEN) or a "0". Dialing a "0" as shown in box 1502 would summon an operator who would then act similar to a conference originator in setting up the conference desired by the calling customer. By dialing the service entry number, however, the customer indicates that he/she wishes to establish the conference under his or her control.

It is contemplated that different service entry numbers will be used to select various features of the system. For example, the customer may be familiar with the procedure of establishing a conference and require little or no prompting. As such, the customer would dial a service entry number denoting that abbreviated prompts can be given and that these prompts can be interrupted if the originator is familiar with the instruction and begins dialing new control information while the instruction is still being played.

In this illustrative embodiment, it is assumed that the service entry number is a three-digit code preceded by the star (*) sign such as "*267" or "*268" with the latter code indicating that the originator is experienced and only requires abbreviated prompts. If the customer dials a valid service entry number, the digits are collected as shown in boxes 1400-1405 in FIG. 14. As the customer uses his station keyset to dial the service entry number, tone receiver 138 collects the digits and forwards them over control bus 134 to NSC processor 101. Tone receiver 138 performs the digit and interdigit timing and functions similar to many well-known digit receivers used in telephony. Upon collecting all the digits, a return is made to the main flow diagram in FIG. 15 where the customer is prompted to dial a code indicating the number of audio ports desired as shown in box 1509.

The system is designed to interact with the user by prompting the user with appropriate announcements. It is anticipated, however, that a customer may err when dialing in response to the instructions given by the announcement system. Accordingly, the system is designed to keep track of the number of errors made by the conference originator. Thus, if a customer makes an error, he/she can be reprompted to take corrective action. If, however, the customer makes a series of errors, the system will automatically summon an operator to assist the customer. For example, should the conference originator neglect to dial and the system detects that timing has elapsed or the originator dials the wrong service entry number as shown in boxes 1504 and 1505, processor 101 would determine if the originator had made any prior errors as shown in boxes 1200-1206 in FIG. 12. If the customer had made too many errors, an announcement would be played to the conference originator asking the originator to stand by while an operator is being summoned to assist him or her. The network services complex then originates a call over an idle T1 trunk in link 131 and the telephone network to operator position 137, and the operator is connected via the time slot interchange 124 to the T1 trunk serving the conference originator. The operator can now assume control of the call and proceed to establish the conference. By assuming control, the tone receiver 138 is connected via time slot interchange 124 to the time slot assigned to the trunk over which the operator was summoned so that the operator can dial instructions into the network services complex for setting up the conference. The conference originator can be connected to the bridge in the usual manner as any of the conferees and control of the bridge will be exercised by the operator.

If the threshold of errors had not been exceeded, the conference originator is told by an announcement that an error has been made and then prompted with a message asking the customer to redial. This occurs when processor 101 executes boxes 1200-1206 in FIG. 12 and sends the appropriate orders to data store 125.

If the conference originator dials the correct service entry number, the NSC processor 101 sends an order to data store 125 to have a prompt played to the originator. This prompt will ask the originator to dial the number of ports needed for the conference.

The digits dialed by the originator are collected by tone receiver 138 and forwarded to NSC processor 101 where the processor ascertains if they are valid.

At this point in the operation, only the digits 0-9 represent a valid code and as many as 64 audio ports can be assigned to a single conference. If a star (*) or pound or number (#) sign are dialed or the customer does not dial (i.e., time-out), the processor treats this as an error as shown in boxes 1512 and 1513 and would reprompt the originator to take corrective action if the threshold had not been exceeded. If the threshold has been exceeded, processor 101 would summon the operator as described above.

Assuming that the originator dials a one or two digit code representing the number of audio ports wanted for the conference, processor 101 consults its memory 1100 to ascertain if the number of ports requested are available. If sufficient ports are available as shown in box 1600, processor 101 commands data store 125 to transmit a confirmation announcement that a sufficient number of audio ports are available as shown in box 1603. If not enough ports are available, processor 101 orders the data store 125 to play back an announcement indicating this to the originator. The originator can abandon the conference and place the conference call at a later time. The originator now dials the pound (#) sign to reserve the audio ports. Processor 101 responds to the dialing of the pound (#) sign by marking the ports in memory as being assigned to this particular conference. If the originator neglected to dial the pound (#) sign, processor 101 would time the call and after a predetermined interval would enter the sequence of events for reserving the data ports as shown in box 1607 just as though the pound (#) sign was dialed. Similar action takes place if the originator dials a digit in the sequence 0-9, except that the digits are ignored.

If the originator dials a star (*) sign, the originator is prompted to redial as shown in box 1604, and a loop in the program sequence is made until the originator dials the correct port selection code for the number of available ports or hangs up. By dialing the star (*) sign, the originator has the opportunity to change his mind and select a different number of ports before the ports are reserved as described above.

Let it be assumed that the conference originator dialed the code for the number of audio ports desired followed by the pound (#) sign. Upon receiving this, NSC processor 101 transmits an order to data store 125 to have the appropriate announcement played to the originator for assisting the customer in establishing the data portion of the conference. In this case, the announcement requests the conference originator to dial a code indicating the number of data ports to be reserved as shown in box 1610.

In the case of a data conference, 64 ports are available and upon receiving a code representing the number of ports that the originator desires (box 1700), processor 101 examines a table in memory 1100 to ascertain if that number of data ports are available. If there are sufficient data ports available, they are reserved for this conference by processor 101 and processor 101 transmits an order to data store 125 to have a confirmation announcement sent to the originator as shown in box 1705.

The sequence of operation with respect to reserving data ports if sufficient data ports are available is similar to the sequence of operations described above with respect to the reservation of the audio bridge ports. This is set forth in FIG. 17 but need not be further described for a complete understanding of the invention.

The NSC processor 101 will now order data store 125 to play an announcement to the originator requesting that the originator dial the directory number assigned to the telephone station of the first audio conferee as shown in box 1715. In this illustrative embodiment, the directory number for an audio conferee takes the form 1-NPA-NXX-XXXX where the one prefix indicates that this is a conferee to be added to the bridge, and the NPA is the three-digit area code while the NXX-XXXX are the three-digit office code and telephone number of the conferee. The directory number assigned to data terminals in this embodiment may take a distinctive form such as a number preceded by the pound (#) sign and the digits 9988. Examples of typical directory numbers assigned to telephone stations and data terminals are shown in FIG. 1.

It will be noted that each conferee directory number is preceded by the digit 1. This permits the other digits on the station dial (i.e., keyset) to be used for control signals as will be described below.

Let it be assumed that the originator dials the prefix 1 as shown in box 1800 followed by the ten-digit code (boxes 1810-1811) of the first audio conferee. Since the tone receiver 138 is still connected to the conference originator, these digits are collected by the tone receiver and forwarded to processor 101. The NSC processor 101 records the number dialed by the originator and associates it in its memory with the particular conference for future use. In addition, processor 101 selects an idle trunk (i.e., time slot) in T1 link 131 to the toll switching system. Processor 101 now transmits a service request and the directory number of the called conferee over data link 132 (box 1812) to toll switching system 102 which responds by originating a call over the network to the called conferee station in a well-known manner.

When the conferee answers (box 1814), the trunk that the conference originator is using is connected via time slot interchange 124 to the trunk that was used to summon the conferee. In this mode, the originator can converse privately with the conferee and inform him/her that a conference call is in progress and that he/she is to be added to the bridge. The originator now depresses the pound (#) button on his keyset to add the conferee to the bridge.

Before adding the conferee, processor 101 interrogates its memory to ascertain what type of conference is to be set up (box 1822). As will be recalled, the conference originator can elect to establish an audio-only, a data-only, or a combined audio/data conference. The processor must now take steps to assure that if a audio conferee was designated by the originator, that the audio conferee is not added to a data conference or that a data conferee is not added to an audio conference.

Thus, in the example being described, the processor 101 ascertains that this is a combined audio/data conference and NSC processor 101 sends an order to the data store 125 requesting that the originator be prompted (box 2000, FIG. 20) with an announcement as to what keys to depress to add the conferee to the appropriate bridge or disconnect the conferee completely.

In the example being described, the originator will transmit the digit 8 (box 2007) if he/she wanted to release the conferee, transmit the digit 2 (box 2003) if he wanted to add the conferee to the audio bridge and transmit the digit 4 (box 2006) to add the conferee to the data bridge. If it is assumed that the conferee is an audio conferee and the originator transmits the digit 2 as shown in box 2003, then processor 101 verifies from its memory that the called conferee is an audio customer (box 2008) and that the conferee has not disconnected before the conferee is added to the bridge (box 2015).

In response to the digit 2 being transmitted by the conference originator, processor 101 selects an idle audio port from its memory which contains an indication of the status of all ports and sends an order to time slot interchange 124 to interconnect the trunk over which the conferee was called with the selected port. In addition, processor 101 sends an order to audio bridge 128 via control bus 134 identifying the conference and the leg or port to be added to the conference.

The NSC processor 101 now orders the data store to deliver another prompt to the originator. This prompt informs the originator that the conferee has been added to the bridge and requests the originator to dial the next conferee or to depress the 2 button so that the originator may be added to the conference bridge.

The conference originator continues by dialing the numbers assigned to the remaining conferees until all conferees have been connected to the audio bridge.

If the originator had dialed the directory number associated with a data terminal and wishes to add this terminal to the data bridge, the originator keys the digit 4 as shown in box 2006. The processor 101 then verifies that this is a data station and instructs data bridge 135 to add the data port to a particular bridge. This is accomplished in a manner similar to the action described above with respect to the addition of a conferee to an audio bridge, namely, the processor 101 sends orders to the data bridge indicating the conference number and the port to be added. Processor 101 also orders data store 125 to play back an announcement requesting the originator to wait for an answer from the data terminal. The data bridge exchanges supervisory signals with the called data terminal (sometimes referred to as a "handshake") and reports back to the processor 101 that the port has been added. Processor 101 then transmits an order over bus 134 to data store 125 so the data store can announce (box 2017) to the conference originator that the data terminal he/she has requested has been added to the data bridge.

The sequence of events described above with respect to adding both audio stations and data terminals to the conference bridges is repeated until all conferees have been added. When the originator is ready to join the conference, the originator depresses the "2" button on his keyset.

Recognizing the digit "2" processor 101 ascertains if the originator had been on the conference before (box 1900). If not, processor 101 orders data store 125 to play back an announcement (box 1901) to the originator prompting the originator of the various options and control features that are available with the conference service. The conference is now in a stable state and the audio conferees can converse with each other and exchange data via their data sets. Supervision of the various conference legs is monitored by the toll switching system 102 for a disconnect (box 1907). Should any of the parties disconnect, processor 101 receives a message over link 132 informing the processor of the disconnect. The processor then begins timing the conference to determine if this is a valid disconnect. If all conferees disconnect (boxes 1910 and 1913) within the time interval, processor 101 orders the data bridge processor and audio bridge processor to disconnect the legs of the respective bridges so they may be available for other conferences. If all conferees have not disconnected within the time interval and the originator has disconnected, the teleconferencing operator is summoned as shown in box 1912 and FIG. 13.

In accordance with a feature of the invention, when the originator depressed the "2" button to add a conferee to the bridge and the NSC processor 101 verifys that the new conferee is still off-hook as shown in box 2015, processor 101 executes the sequence of operations shown in FIG. 21, to advise those on the conference that a new conferee is about to be added.

More specifically, processor 101 selects an idle audio port and then sends an order over control bus 134 to the audio bridge processor to add that port to the conference in a "broadcast" mode as shown in boxes 2100 and 2101. (Orders were sent previously by the NSC processor to the data store at initialization time to activate the playback buffers with tones.) An order is now sent to the time slot interchange 124 to interconnect the playback buffer designated TB1, with the audio port just activated.

At this point a relatively low tone is connected to the bridge for all conferees to hear for a time interval determined by box 2103.

At the expiration of time "x", orders are sent by the NSC processor 101 to disconnect the first playback channel and connect a second playback channel to the bridge so that tone TB-2 can be played to the conference (see boxes 2104–2105).

Tone TB-2 is a higher pitch tone than TB-1 and the combined rising tones TB-1 and TB-2 indicate to the listeners on the bridge that a new conferee is about to be added.

At the expiration of time interval "y" as indicated by the execution of the yes branch of box 2105, tone TB-2 is disconnected from the port and the port is deleted from the audio bridge. Processor 101 now begins timing an interval designated Z as indicated by box 2107.

The time interval Z delays the actual connection of the conferee to the bridge to allow the existing conferees on the bridge to terminate any private conversation and prepare for the entry of the new conferee.

At the end of time interval Z processor 101 orders the port to be added to the conference, and the port is designated as a "normal" port, i.e., that conferees speech will be summed with the other conferees in the usual manner determined by the audio bridge processor 200. Processor 101 also sends an order to the time slot interchange 124 to connect the T1 trunk serving the conferee with the port.

In summary, a conference arrangement has been disclosed wherein customers establish audio-only, data-only and combined audio/data conferences under the guidance of machine announcements and wherein participants in a conference are warned each time a conferee is about to be added to the conference. The addition of the conferee is then delayed so as not to disrupt the existing conference.

It is to be understood that the arrangements described herein are merely illustrative of the applications of the principles of the invention and that numerous other arrangements may be devised by those skilled in the art without departing from the spirit and scope of the invention.

What is claimed is:

1. For use in a conference system comprising a multi-port conference bridge, a method for activating a conference port on the bridge comprising the steps of
transmitting a signal to the bridge to alert other ports thereon that an additional one of said conference ports is about to be activated, and
activating said additional port independently of the control of said other ports at a predetermined time interval after the transmission of said signal.

2. The invention set forth in claim 1 wherein the step of transmitting a signal comprises the step of coupling an audio tone to the bridge for a prescribed interval and wherein the step of activating said additional port is implemented at the end of said predetermined interval after the expiration of said prescribed interval.

3. For use in a conference system comprising a multi-port conference bridge, a method for activating a conference port on the bridge comprising the steps of
transmitting a signal to the bridge that a conference port is about to be activated wherein the signal comprises a plurality of audio tones, each said tone having a frequency different than any other said tone in said plurality, and
activating the port at a predetermined time interval after the transmission of said signal.

4. For use in an audio conference system having an audio bridge, a plurality of ports effective when activated for interconnecting customer stations via said bridge, a method for activating one of said ports for connection to a prescribed one of said customer stations comprising the steps of
selecting an idle one of said ports,
coupling the selected port to a tone source,
disconnecting the tone source from the selected port after a first time interval, and
activating the selected port for connection to said prescribed customer station after a second time interval and independent of the control of any other of said ports.

5. For use in an audio conference system having an audio bridge, a plurality of ports effective when activated for interconnecting customer stations via said bridge, a method for activating one of said ports for connection to a prescribed one of said customer stations comprising the steps of
selecting an idle one of said ports,
successively coupling the selected port to a plurality of tone sources each having a distinct frequency,
disconnecting said tone sources from the selected port after a first time interval, and
activating the selected port for connection to said prescribed customer station after a second time interval.

6. For use in an audio conference system having an audio bridge, a plurality of ports effective when activated for interconnecting customer stations via said bridge, a method for activating one of said ports for connection to a prescribed one of said customer stations comprising the steps of
selecting an idle one of said ports,
coupling the selected port to a tone source and altering the output of the tone source,
disconnecting the tone source from the selected port after a first time interval, and
activating the selected port for connection to said prescribed customer station after a second time interval.

7. The invention set forth in claim 4
wherein the step of activating the selected port includes the step of timing the second interval from the end of the first time interval.

8. For use in an audio conference system having an audio bridge, a plurality of ports effective when activated for coupling customer stations to said bridge for conferencing, a method for warning any customer station already coupled to the bridge of the addition of another station to the bridge comprising the steps of coupling a warning signal to a selected one of the ports, activating the selected port on the bridge for a first prescribed interval of time to apply the warning signal to the bridge, deactivating the selected port after the first interval of time to remove the warning signal from the bridge for a second prescribed interval of time, and activating, independently of the control of any said station already coupled to the bridge, a port to couple the other said station to be added to the bridge at the expiration of the second interval.

9. For use in an audio conference system having an audio bridge, a plurality of ports effective when activated for coupling customer stations to said bridge for conferencing wherein speech signals transmitted from any of said customer stations are summed from selected stations for retransmission back to all stations, a method for warning any customer station already coupled to the bridge of the addition of another station to the bridge comprising the steps of coupling a warning signal to a selected one of the ports, activating the selected port on the bridge for a first prescribed interval of time to apply the warning signal to the bridge and designating that samples from the selected port are always included in the sum to be retransmitted, deactivating the selected port after the first interval of time to remqve the warning signal from the bridge for a second prescribed interval of time, and activating a port to couple the other station to be added to the bridge at the expiration of the second interval.

10. For use in an audio conference system having an audio bridge, a plurality of ports effective when activated for interconnecting customer stations via said bridge wherein speech signals transmitted from customer stations are summed from selected stations for retransmission back to all stations, a method for activating one of said ports for connection to a prescribed one of said customer stations comprising the steps of selecting an idle one of said ports;

coupling the selected port to a tone source;

designating that the speech signals from the selected port are always included in the sum to be retransmitted;

disconnecting the tone source from the selected port after a first time interval; and activating the selected port for connection to said prescribed customer station after a second time interval.

* * * * *